(12) United States Patent
Kato et al.

(10) Patent No.: US 6,805,105 B2
(45) Date of Patent: Oct. 19, 2004

(54) FUEL SUPPLY SYSTEM FOR ALTERNATIVE FUEL

(75) Inventors: Masaaki Kato, Kariya (JP); Satoru Sasaki, Kariya (JP); Hisaharu Takeuchi, Tokoname (JP)

(73) Assignee: Denso Corporation (JP)

( * ) Notice: Subject to any disclaimer, the term of this patent is extended or adjusted under 35 U.S.C. 154(b) by 234 days.

(21) Appl. No.: 10/173,765

(22) Filed: Jun. 19, 2002

(65) Prior Publication Data

US 2002/0189589 A1 Dec. 19, 2002

(30) Foreign Application Priority Data

Jun. 19, 2001 (JP) ........................................ 2001-185673

(51) Int. Cl.[7] ............................................. F02M 37/04
(52) U.S. Cl. ..................... 123/514; 123/516; 123/276 E
(58) Field of Search ................. 123/446, 514, 123/541, 276 E, 525, 527, 516, 497

(56) References Cited

U.S. PATENT DOCUMENTS

| | | | | |
|---|---|---|---|---|
| 5,097,803 | A | * 3/1992 | Galvin | 123/3 |
| 5,485,818 | A | * 1/1996 | McCandless | 123/294 |
| 5,564,391 | A | * 10/1996 | Barnes et al. | 123/446 |
| 5,690,078 | A | * 11/1997 | Ofner | 123/529 |
| 5,918,578 | A | 7/1999 | Oda | |
| 6,318,344 | B1 | * 11/2001 | Lucier et al. | 123/516 |
| 6,450,148 | B2 | * 9/2002 | Nakamura et al. | 123/464 |
| 6,453,877 | B1 | * 9/2002 | Lucier et al. | 123/497 |

FOREIGN PATENT DOCUMENTS

| | | |
|---|---|---|
| DE | 40 26 689 | 3/1991 |
| EP | 0 979 940 | 2/2000 |
| FR | 2 629 516 | 10/1989 |
| GB | 2 237 074 | 4/1991 |
| JP | 4-353262 | 12/1992 |
| JP | 10-281029 | 10/1998 |
| JP | 10-281030 | 10/1998 |
| WO | WO 99/43941 | 9/1999 |

OTHER PUBLICATIONS

Patent Abstracts of Japan; vol. 1999, No. 04; Apr. 30, 1999 & JP 11 022590 A; Jan. 26, 1999.

Hofner et al; "A Fuel Injection System Concept for Dimethyl Ether", C517/022; ImechE, 1996, pp. 275–288.

* cited by examiner

Primary Examiner—Carl S. Miller
(74) Attorney, Agent, or Firm—Nixon & Vanderhye PC

(57) ABSTRACT

A fuel supply apparatus is provided which works to supply fuel such as a dimethly ether used as an alternative to a typical fuel for an internal combustion engine. The fuel supply apparatus includes a high-pressure pump working to feed the to injectors from a fuel tank through a common rail, a fuel return line, and a compressor working to add to a back pressure higher than a vapor pressure of the fuel to the return line. The addition of the back pressure higher than the vapor pressure of the fuel facilitates liquidizing of the fuel. This results in a decrease in leakage of the fuel, which improves the efficiency of burning of the fuel and ensures the startability and drivability of the engine.

25 Claims, 17 Drawing Sheets

FUEL SUPPLY SYSTEM FOR ALTERNATIVE FUEL

BACKGROUND OF THE INVENTION

1. Technical Field of the Invention

The present invention relates generally to an improved fuel supply system designed to supply to diesel engines an alternative fuel such as dimethyl ether (DME) which is lower in viscosity and susceptible to vaporization.

2. Background Art

Fuel now being developed as an alternative to diesel fuel such as light oil is showing a tendency to have a lower viscosity and higher evaporability. Typical of such an alternative fuel is dimethly ether which has a cetane number nearly equal to that of the diesel fuel and is lower in concentration of NOx and HC contained in exhaust emissions of the engine. For these reasons, dimethly ether is being expected to become an alternative fuel for diesel engines which produces black smoke in small quantities over the whole of an output range.

Japanese Patent First Publication Nos. 10-281029 and 10-281030 each teach a fuel injection pump for diesel engines employing dimethly ether as a main fuel. The fuel injection pump is designed to have a decreased gap (less than 3 μm) between a plunger and a plunger barrel in order to reduce a leakage of fuel and to return the fuel leaking out of the gap to an inlet pipe of the engine through a leakage gas return line.

A technical paper IMechE (C517/022/96) describes a fuel injection system designed to supply a dimethly ether fuel through a high-pressure fuel supply pump to a common rail and to injectors for realizing low-emission vehicles.

In a case where the gap between the plunger and the barrel in the structure, as taught in each of the above publication Nos. 10-281029 and 10-281030, is 3 μm, this value is typical of standard pumps. Further, returning of the fuel under high pressures to the engine is achieved using a single line. It is, thus, difficult to decrease a leakage of the fuel to a desired quantity. Particularly, under high temperature conditions, the viscosity of the fuel is lowered, thus resulting in a overmuch increase in leakage of the fuel. The total of the fuel leaking out of the fuel injection pump returned to the inlet pipe of the engine and the fuel sprayed from the injectors, thus, exceeds an allowable level, which may result in a difficulty in controlling the diesel engine correctly.

The system, as taught in the technical paper IMechE (C517/022/96), is designed to produce a pressure intermediate between an injection pressure and a fuel feed pressure to avoid evaporation of the fuel and returns a leaking fuel to a fuel path kept at the intermediate pressure. The injector is equipped with a solenoid valve. A difference between the intermediate pressure and the injection pressure is used to open the injector. This eliminates a leakage of the fuel from the injector to a lower-pressure side completely, but however, resulting in an overmuch leakage of the fuel from high to intermediate pressure side.

Further, the solenoid valve built in the injector is of a hydraulically servo type and thus complex in structure, which result in a difficulty in ensuring a quick response.

The production of the intermediate pressure requires a large number of control valves and intermediate tanks, thus resulting in a difficulty in using the system with diesel engines.

The system is also designed to relieve the fuel from the feed tank, the intermediate tank, and the common rail to a purge tank using a solenoid valve during standstill of the engine. This, however, requires a supply pump to output a large quantity of fuel when it is required to fill the common rail with the fuel, thus resulting in a time delay in starting the engine.

SUMMARY OF THE INVENTION

It is therefore a principal object of the invention to avoid the disadvantages of the prior art.

It is another object of the invention to provide an alternative fuel supply system which has a simple structure designed to reduce the quantity of fuel leaking out of a high-pressure pump and return it to a fuel tank, thereby ensuring a desired quantity of fuel to be fed to an internal combustion engine, which results in improved fuel economy, engine startability, and engine drivability.

According to one aspect of the invention, there is provided a fuel supply apparatus for supplying fuel such as a dimethly ether used as an alternative to a typical fuel for an internal combustion engine. The fuel supply apparatus comprises: (a) a high-pressure pump working to feed a fuel which is susceptible to vaporization to injectors from a fuel tank through a common rail under a given high pressure; (b) a return line extending from the high-pressure pump to the fuel tank; and (c) a pressurizing mechanism working to add to the return line a back pressure higher than a vapor pressure of the fuel. The addition of the back pressure higher than the vapor pressure of the fuel facilitates liquidizing of the fuel. When the fuel is injected into the injectors, a high-pressure feed pressure and an injection pressure are held within the closed circuit in a fluid-tight fashion without use of an intermediate pressure. The fuel leaking from the high-pressure pump at a lower pressure is introduced into a purge tank or an inlet pipe of the engine, thereby resulting in a decrease in leakage of the fuel, which improves the efficiency of burning of the fuel and ensures the startability and drivability of the engine. In a case where a dimethly ether which is susceptible to vaporization and has a low viscosity is used, exhaust emissions of the engine contains less NOx, HC, and black smoke.

In the preferred mode of the invention, the high-pressure pump includes a pump chamber to which the fuel from the feed pump is inputted through a fuel gallery at a feed pressure, a plunger reciprocating within a plunger chamber formed within a cylinder to pressurize the fuel within the pump chamber and inject the pressurized fuel into the engine through a discharge valve and each of the injectors, a higher-pressure leakage line, and a lower-pressure leakage line. The higher-pressure and lower-pressure leakage lines work to withdraw the fuel leaking out of the pump chamber through a gap between the plunger and the plunger chamber following reciprocating motion of the plunger.

The higher-pressure leakage line communicates with the fuel gallery through a feed line. The lower-pressure leakage line communicates with a sealed chamber formed beneath the plunger.

The fuel flowing through the lower-pressure leakage line is withdrawn through a withdrawing means provided in the cylinder.

The withdrawing means is implemented by a leakage path formed in a side wall of the cylinder.

The apparatus further comprises a solenoid valve which is disposed within an upper end portion of the cylinder and includes a valve member, a valve body, a non-magnetic member, and a plurality of cores. The valve member works to selectively open and close a line connecting between the pump chamber and the fuel gallery to control an amount of the fuel flowing out of the discharge valve. The valve body is disposed within the upper end portion of the cylinder in a fluid-tight fashion. The cores are arranged coaxially with each other through the non-magnetic member and welded rigidly in a fluid-tight fashion inside the solenoid valve.

The discharge valve is opened in response to a pressure which acts thereon and is lower than the feed pressure.

The apparatus further comprises a pressure regulator connected to the fuel gallery. The pressure regulator includes a valve which is urged by a spring into a closed state. The valve of the pressure regulator is moved by a back pressure arising from a vapor pressure of the fuel against a mechanical pressure produced by the spring so that the valve is opened to discharge the fuel flowing from the fuel gallery.

The apparatus further comprises a pressure sensor and a temperature sensor which measure a pressure and a temperature of the fuel whose bulk modulus of elasticity and density are sensitive to changes in pressure and temperature of the fuel and a control circuit which works to correct a discharged amount of the fuel from the high-pressure pump as functions of the pressure and temperature measured by the pressure and temperature sensors to modify a pressure of the fuel stored in the common rail to a given level and to control a quantity of the fuel injected to the engine through the injectors to a give value as a function of an operating condition of the engine.

The pressurizing mechanism may be implemented by a compressor which works to pressurize the fuel being returned to the fuel tank.

According to the second aspect of the invention, there is provided an alternative fuel supply apparatus for an internal combustion engine which comprises: (a) a high-pressure pump connected to a fuel tank through a feed pump, a fuel cooler, and a fuel filter, the fuel tank storing therein a vaporable fuel under pressure higher than a vapor pressure of the fuel; (b) a common rail within which the fuel supplied from the fuel tank through the high-pressure pump is stored at a given high pressure, the common rail being connected to injectors working to inject the fuel into the engine; (c) a pressure limiter installed in the common rail to set a maximum pressure within the common rail; (d) a fuel return line returning fuel relieved from the common rail through the pressure limiter and fuel flowing out of the high-pressure pump to the fuel tank; and (e) a fuel selector valve, a purge tank, a compressor, and a fuel cooler installed in the fuel return line in this order. This structure holds a high-pressure feed pressure and an injection pressure within a closed circuit in a fluid-tight fashion without use of an intermediate pressure when the fuel is injected into the injectors. The fuel leaking from the high-pressure pump at a lower pressure is introduced into the purge tank or an inlet pipe of the engine, thereby resulting in a decrease in leakage of the fuel, which improves the efficiency of burning of the fuel and ensures the startability and drivability of the engine.

In the preferred mode of the invention, the high-pressure pump includes a pump chamber to which the fuel from the feed pump is inputted through a fuel gallery at a feed pressure, a plunger reciprocating within a plunger chamber formed within a cylinder to pressurize the fuel within the pump chamber and inject the pressurized fuel into the engine through a discharge valve and each of the injectors, a higher-pressure leakage line, and a lower-pressure leakage line. The higher-pressure and lower-pressure leakage lines work to withdraw the fuel leaking out of the pump chamber through a gap between the plunger and the plunger chamber following reciprocating motion of the plunger.

The higher-pressure leakage line communicates with the fuel gallery through a feed line. The lower-pressure leakage line communicates with a sealed chamber formed beneath the plunger.

The fuel flowing through the lower-pressure leakage line is withdrawn through a withdrawing means provided in the cylinder.

The withdrawing means may be implemented by a leakage path formed in a side wall of the cylinder.

The apparatus further comprises a solenoid valve which is disposed within an upper end portion of the cylinder and includes a valve member, a valve body, a non-magnetic member, and a plurality of cores. The valve member works to selectively open and close a line connecting between the pump chamber and the fuel gallery to control an amount of the fuel flowing out of the discharge valve. The valve body is disposed within the upper end portion of the cylinder in a fluid-tight fashion. The cores are arranged coaxially with each other through the non-magnetic member and welded rigidly in a fluid-tight fashion inside the solenoid valve.

The discharge valve is opened in response to a pressure which acts thereon and is lower than the feed pressure.

The apparatus further comprises a pressure regulator connected to the fuel gallery. The pressure regulator includes a valve which is urged by a spring into a closed state. The valve of the pressure regulator is moved by a back pressure arising from a vapor pressure of the fuel against a mechanical pressure produced by the spring so that the valve is opened to discharge the fuel flowing from the fuel gallery.

The pressure limiter sets a maximum pressure within the common rail and is controlled in a fluid-tight fashion by opening and closing a solenoid valve.

The feed pump is installed in the fuel tank which is kept at a vapor pressure of the fuel. The vapor pressure of the fuel is added to a feed pressure of the feed pump.

The fuel selector valve may be implemented by a three-way valve. When the fuel returning from each of the high-pressure pump and the pressure limiter is in a gaseous state, the fuel selector valve feeds it to the purge tank. When the fuel returning from each of the high-pressure pump and the pressure limiter is in a liquid state, the fuel selector feeds it to the fuel tank.

The compressor works to pressurize the fuel which is stored within the purge tank in a gaseous state and bring it into a liquid state through the fuel cooler which is, in turn, returned back to the fuel tank.

The high-pressure pump has a discharge valve which is opened in response to a pressure lower than or equal to the sum of a feed pressure of the feed pump and a vapor pressure of the fuel within the fuel tank. At start-up of the engine, a vaporized fuel is withdrawn from the discharge valve to the fuel tank in a liquid state through the common rail, the pressure limiter, the fuel selector valve, and the purge tank.

The apparatus further comprises a pressure sensor and a temperature sensor which measure a pressure and a temperature of the fuel whose bulk modulus of elasticity and density are sensitive to changes in pressure and temperature of the fuel and a control circuit which works to correct a discharged amount of the fuel from the high-pressure pump as functions of the pressure and temperature measured by the pressure and temperature sensors to modify a pressure of the fuel stored in the common rail to a given level and to control a quantity of the fuel injected to the engine through the injectors to a give value as a function of an operating condition of the engine.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
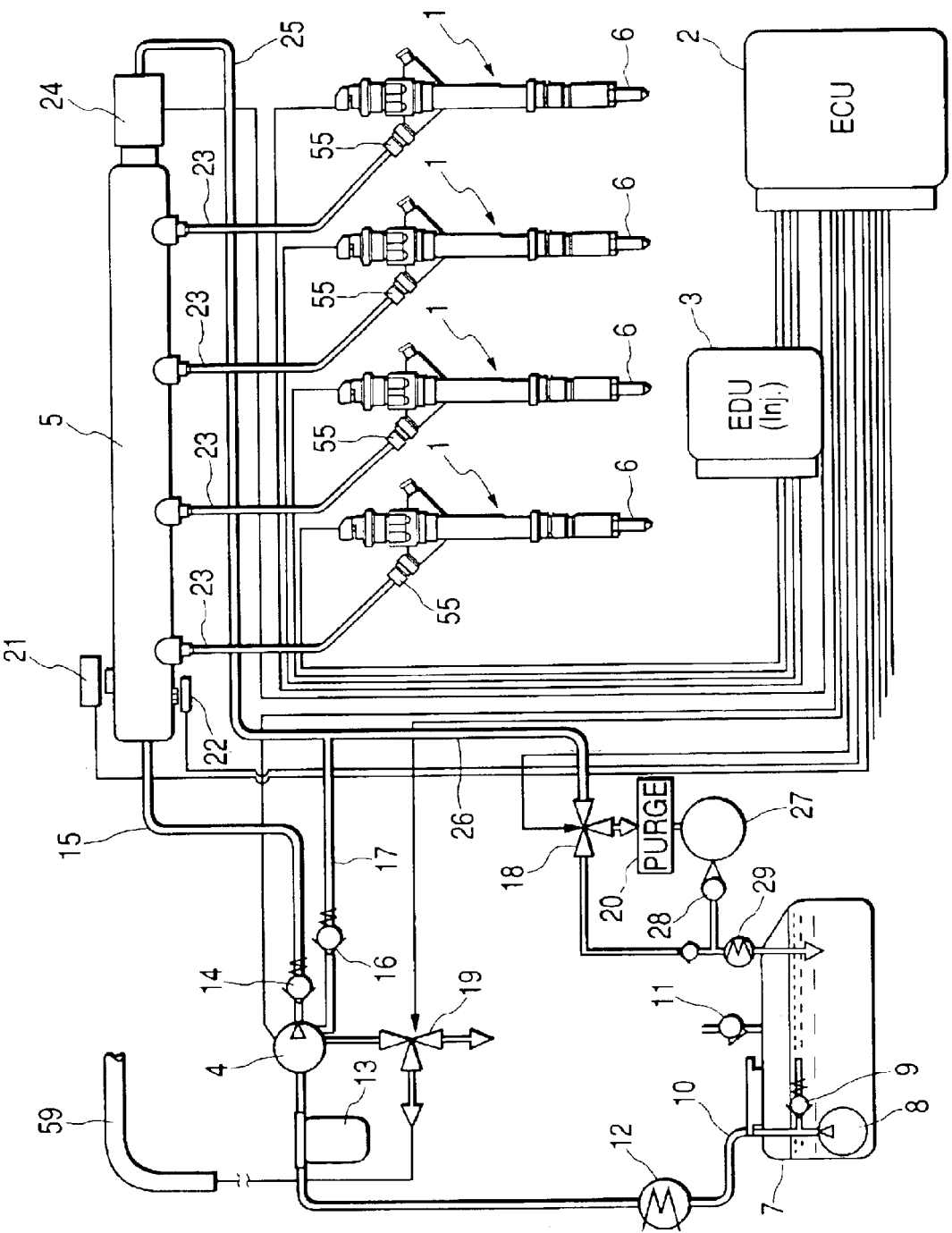
FIG. 1 is a block diagram which shows a fuel supply system used with a fuel injection system for diesel engine according to the invention.

Referring to the drawings, wherein like reference numbers refer to like parts in several views, particularly to FIG. 1, there is shown a fuel supply system according to the invention which is used, as an example, with a fuel injection system designed to inject a high-pressure fuel into a diesel engine. The high-pressure fuel, as employed in this embodiment, is an alternative fuel which may contain only dimethyl ether (DME) having an original or modified viscosity or any diesel fuel components in addition to a main component of DME. The alternative fuel as used in this embodiment has a lower viscosity and susceptible to vaporization.

The fuel injection system includes fuel injectors 1, an electronic control unit (ECU) 2, and an electrical driving unit (EDU) 3. Each of the fuel injectors 1 is installed in an engine head of the diesel engine and works to inject the alternative fuel into a combustion chamber defined above a piston reciprocating within a cylinder of the engine. In the following discussion, the alternative fuel will be referred to as DME fuel.

The ECU 2 picks up information about the speed, load, and fuel of the diesel engine, an intake air, and the temperature of cooling water and provides an injection control signal to the EDU 3. The EDU 3 is responsive to the injection control signal to output a driving current to each of the injectors 1.

Each of the injectors 1 has a nozzle 6 which is relatively greater in diameter and to which the DME fuel is supplied from a common rail 5 through a high-pressure line 23. The DME is pressurized by a high-pressure pump 4 driven electrically by the ECU 2 and accumulated within the common rail 5.

The high-pressure pump 4 is coupled to a fuel tank 7 through a fuel cooler 12 and a fuel filter 13. Within the fuel tank 7, the DME fuel is under a given pressure which is selected as a function of a vapor pressure of the DME fuel and required to keep the DME fuel a liquid. The fuel tank 7 has disposed therein a feed pump 8 which supplies a feed pressure to the high-pressure pump 4 in addition to the vapor pressure of the DME fuel.

A pressure regulator 9 is connected to the feed pump 8 through a fuel supply line 10 leading to the high-pressure pump 4. The pressure regulator 9 works to regulate the feed pressure produced by the feed pump 8 below a withstand pressure of a fuel gallery, as will be described later in detail, of the high-pressure pump 4. The fuel tank 7 has installed on a relief valve 11 which relieves the pressure within the fuel tank 7 beyond an upper limit the fuel tank 7 is able to withstand.

The fuel cooler 12 and the fuel filter 13 each have a structure capable of withstanding the feed pressure. The fuel filter 13 is designed to absorb pulsation of inlet and outlet pressures of the high-pressure pump 4 and the feed pump 8 as functions of an internal volume of the fuel filter 13 and a sectional area of the fuel supply line 10 as well as to filter the DME fuel.

The high-pressure pump 4, as will be described later in detail, works to output the pressurized DME fuel and lifts up or open a discharge valve 14 to supply the DME fuel to the common rail 5 through a high-pressure line 15. The pressure in the fuel gallery of the high-pressure pump 4 is kept by a pressure regulator 16 at a preselected set level.

The set pressures of the pressure regulator 9 disposed within the fuel tank 7 and the pressure regulator 16 installed on the high-pressure pump 4 are substantially identical with each other in order to ensure a given maximum pressure of the DME fuel.

The vapor pressure of the DME fuel acts on an outlet of the pressure regulator 16. The vapor pressure of the DME fuel will change as a function of the temperature of the DME fuel to thereby modify a pressure (will also be referred to as a valve-opening pressure below) at which the pressure regulator 16 is opened. This enables the pressure in the fuel gallery of the high-pressure pump 4 to be increased with an increase in pressure of the DME fuel to control the vaporization of the DME fuel within the fuel gallery of the high-pressure pump 4.

After passing through the pressure regulator 16, the DME fuel is supplied to a fuel selector valve 18 through a return line 17. The fuel selector valve 18 is implemented by a three-way valve. The DME fuel leaking out of the high-pressure pump 4 is collected, as will be described later in detail, and transferred to a fuel selector valve 19. The fuel selector valve 19 works to feed the DME fuel selectively to a purge tank 20 or an inlet pipe 59 of the diesel engine as a function of an operating condition of the diesel engine.

The DME fuel supplied to the common rail 5 is checked by a pressure sensor 21 and a temperature sensor 22 as to whether it is in a gaseous or a liquid state. The pressure sensor 21 is installed in the common rail 5 and measures the pressure in the common rail 5 to provide a signal indicative thereof to the ECU 2. Similarly, the temperature sensor 22 is installed in the common rail 5 and measure the temperature in the common rail 5 to provide a signal indicative thereof to the ECU 2. The temperature sensor 22 may alternatively be installed in the high-pressure pump 4 or the high-pressure line 5.

To the common rail 5, as many high-pressure lines 23 as cylinders of the diesel engine are coupled to supply the DME fuel to the injectors 1, respectively.

The common rail 24 has also installed therein a pressure limiter 24 which sets a maximum pressure within the common rail 5. The pressure limiter 24 is opened or closed at the start-up and stop of the diesel engine as functions of the temperature and pressure of the DME fuel within the common rail 5.

The DME fuel relieved from the pressure limiter 24 is sent through a return line 25 to a return line 26 coupled to the return line 17, so that it enters the fuel selector valve 18 together with that discharged from the pressure regulator 16.

The fuel selector valve 18 is actuated in response to a selection signal provided by the ECU 2 as functions of the operating condition of the diesel engine and the temperature of the DME fuel and works to return the DME fuel to the fuel tank 7 or supply the purge tank 20.

The DME fuel stored in the purge tank 20 is pressurized by a compressor 27 so that it opens a check valve 28 and enters the fuel cooler 29. The fuel cooler 29 cools and liquefies the DME fuel and returns it to the fuel tank 7.

Figure 2:
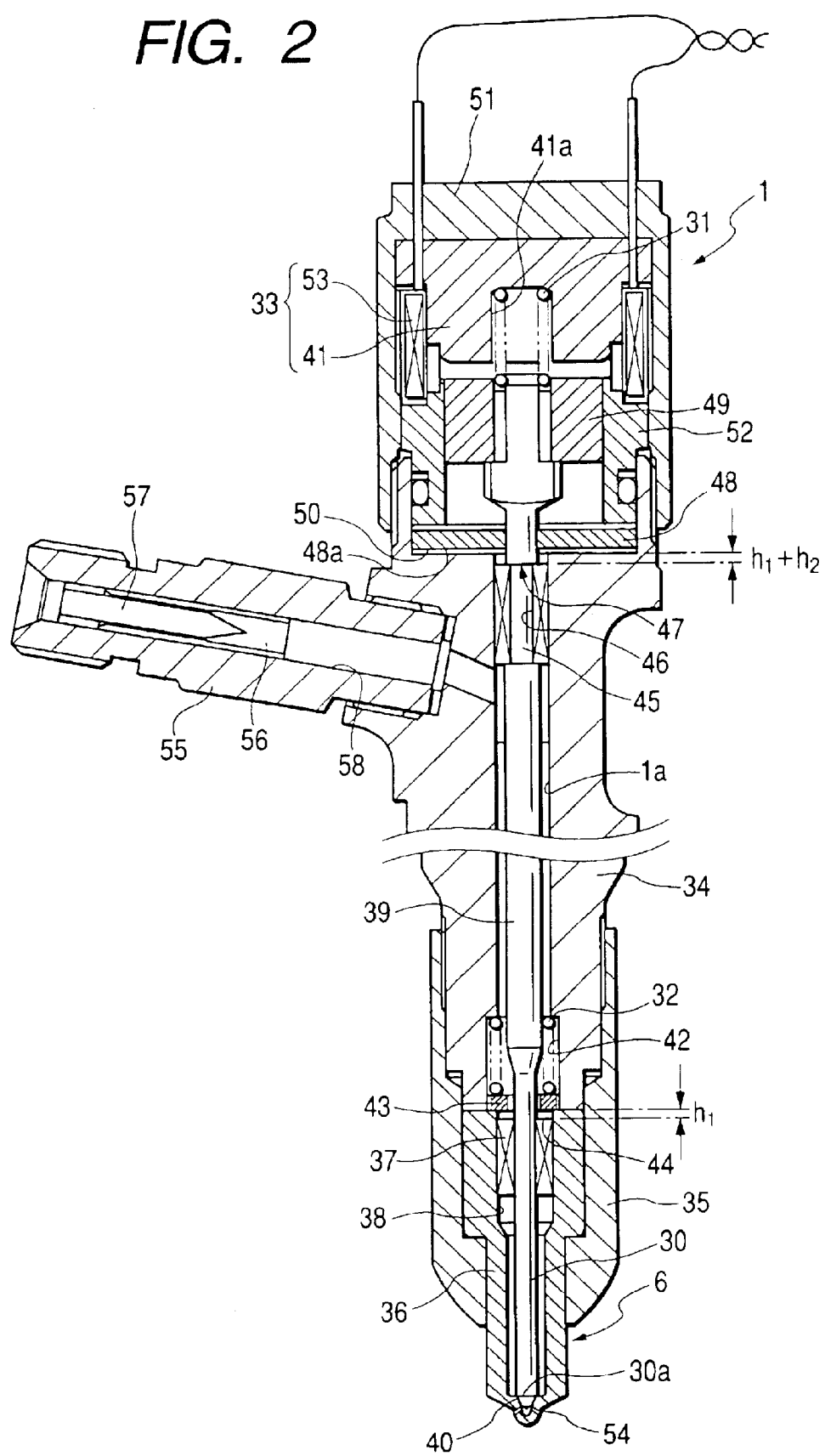
FIG. 2 is a longitudinal sectional view which shows a fuel injector.

Each of the injectors 1 actuated electrically by the EDU 3 has an internal structure, as shown in FIG. 2.

The injector 1 includes a first coil spring 31, a second coil spring 32, a solenoid 33, and a nozzle 6. The first coil spring 31 is used to adjust the amount of lift of a needle valve 30 disposed in a central bore 1a. The nozzle 6 is joined to an injector body 34 by a retaining nut 35.

The nozzle 6 has a nozzle body 36. The nozzle body 36 has formed therein a larger chamber 38 within which a guide member 37 is installed slidably in a lengthwise direction of the nozzle body 36 for guiding movement of the needle valve 30. The needle valve 30 is urged elastically by the first coil spring 31 into constant engagement with a seat 40 of the nozzle body 36 through a rod or plunger 39. The first coil spring 31 has a spring constant k1 and is compressed to produce an initial set load Fs1. The first coil spring 31 is disposed within a spring chamber 41a formed in a core 41 of the solenoid 33.

The second coil spring 32 has a spring constant k2 and is compressed to produce an initial set load Fs2. The second coil spring 32 is disposed within a spring chamber 42 formed in the injector body 34 to urge a spring seat 43 into constant engagement with an end of the nozzle body 36. When the spring seat 43 rests on the nozzle body 36 within the spring chamber 42, it defines a clearance between a lower surface thereof and a shoulder 44 of the needle valve 30 (i.e., the end of the guide member 37) as a first lift distance h1 of the needle valve 30.

The plunger 39 has a guide member 45 fitted within a chamber 46 of the injector body 34. When the needle valve 30 is in a closed state, an upper end surface 47 of the guide member 45 is located at an interval (h1+h2) away from a plate 48.

Disposed between the plate 48 and the injector body 34 is a set of shims 50 which have different thickness and are replaceable in order to adjust the interval (h1+h2) to a desired value.

The plate 48 may be replaced with another having a different thickness for adjusting a clearance between an armature 49 and the core 41 of the solenoid 33 to a desired one. A maximum lift of the needle valve 30 corresponds to the interval (h1+h2) between the plate 48 and the guide member 46. The first lift distance h1 may be modified by changing the location of the shoulder 44 of the needle valve 30.

The solenoid 33 is joined to the injector body 334 using a nut 51. When energized, the solenoid 33 produces a magnetic circuit through a coil 53, the armature 49, the core 41, and a ring 52 surrounding the armature 49. The plunger 39 is connected at an upper end thereof to the armature 49 by press-fitting or welding. The plunger 39 is urged by the first coil spring 31 downward, as viewed in FIG. 2, together with the armature 49, thereby bringing the tip 30a of the needle valve 30 into constant engagement with the seat 40 of the nozzle body 36.

When the coil 53 of the solenoid 33 is energized, it will cause the armature 49 to be attracted to the core 41 against the spring pressure of the first coil spring 31. This causes the plunger 39 to be lifted up, so that the needle valve 30 is moved out of engagement with the seat 40 to open the spray holes 54. The needle valve 30 moves the first lift distance hi and stops upon abutment of the shoulder 44 against the spring seat 43.

When a greater current is supplied to the solenoid 33, it will cause a greater electromagnetic attractive force to be produced to lift up the plunger 39 further along with the needle valve 30 against the spring pressures of the first and second coil springs 31 and 32. When the needle valve 30 moves the distance (h1+h2), the upper end surface 47 of the guide member 46 of the plunger 39 abuts on the lower end surface 48a of the plate 48 to stop the needle valve 30. Specifically, the needle valve 30 is lifted up by the distance (h1+h2) and held at a maximum lift position.

The injector body 34 has joined thereto a connection pipe 55 leading to the central bore 1a. The connection pipe 55 is coupled with a corresponding one of the high-pressure lines 23 through a bar filter 56 to supply the DME fuel into the central bore 1a.

The bar filter 56 is press fit within a bore 58 formed in the connection pipe 55 and has a typical structure in which a plurality of elongated grooves 57 are formed.

Figure 3:
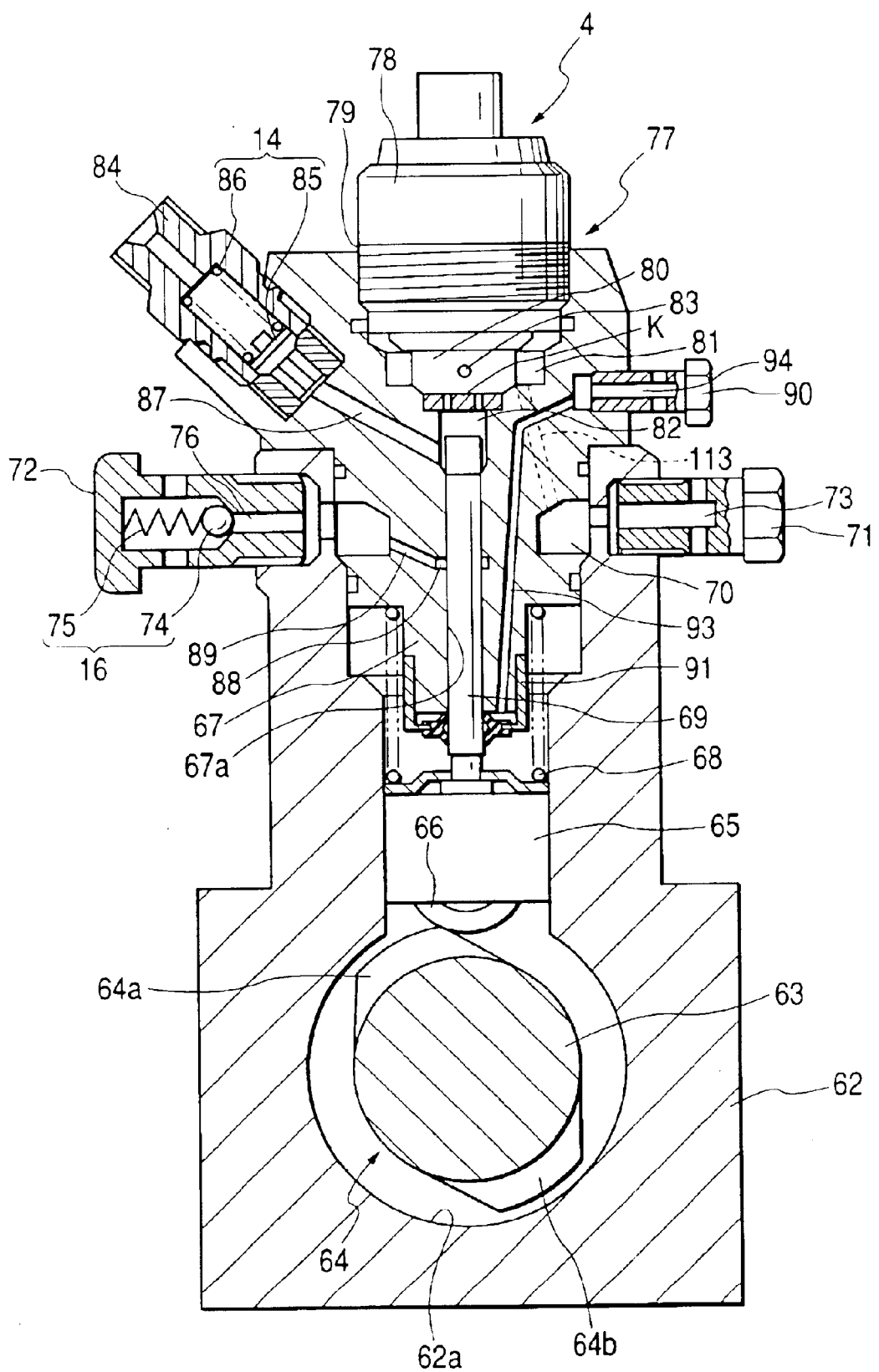
FIG. 3 is a longitudinal sectional view which shows a high-pressure pump working to feed fuel into a common rail.

FIG. 3 shows an internal structure of the high-pressure pump 4 in detail.

The high-pressure pump 4 is driven by the diesel engine to supply the DME fuel to each of the injectors 1 through the high-pressure line 15, the common rail 5, and the connection pipe 55. The pressure of the DME fuel is controlled through the ECU 2 as functions of the speed or load of the diesel engine, temperatures of the fuel, intake air, and cooling water, and pressure of the DME fuel in the common rail 5.

The high-pressure pump 4 has a housing 62 and a cam shaft 63 installed rotatably on a lower portion of the housing 62. The cam shaft 63 is driven by the diesel engine and has installed thereon a cam 64 having convex portions 64a and 64b opposed diametrically to each other. The cam 64 is in contact with a roller 66 (i.e. a cam follower) retained rotatably by a tappet 65. The roller 66 works to follow rotation of the cam 64 to move the tappet 65 vertically, as viewed in the drawing.

The high-pressure pump 4 also includes a cylinder 67, a plunger 69 and a fuel gallery 70. The cylinder 67 is crewed into an upper opening of the housing 62 and retained in fluid-tight fashion at an interval away from the tappet 65. The tappet 65 works to move the plunger 69 vertically along an inner wall 76a of the cylinder 67. The plunger 69 is urged upward by a compression coil spring 68 at all times.

The fuel gallery 70 is defined by an annular groove formed between the housing 62 and the cylinder 67. The fuel gallery 70 forms a feed circuit filled with the DME fuel supplied from the feed pump 8. The housing 62 has a hollow inlet screw 71 and a hollow outlet screw 72 joined thereto in fluid-tight fashion. The DME fuel enters at the inlet screw 71. The inlet screw 71 communicates with the fuel gallery 70 through a fuel path 73 to.

The outlet screw 72 communicates with the fuel gallery 70 through a fuel path 76 and has the pressure regulator 16 installed therein (see FIG. 1). The pressure regulator 16 is made up of a regulating valve 74 and a coil spring 75 and works to define a maximum pressure within the fuel gallery 70. The coil spring 75 produces a mechanical pressure at which the regulating valve 74 is to be opened. The outlet screw 72 is connected to the fuel tank 7, as shown in FIG. 1, through the return lines 17 and 26 and the fuel selector valve 18 to return the DME fuel into the fuel tank 7 when the regulating valve 74 is opened.

When the regulating valve 74 is opened, the DME fuel spills from the fuel path 76, so that the part of the DME fuel vaporizes due to a rise in temperature of the DME fuel. This causes vapor pressure of the DME fuel to be produced which is, in turn, exerted on the regulating valve 74 in a valve-closing direction. Specifically, a valve-opening pressure produced by the coil spring 75 at which the regulating valve 74 is to be opened changes with a change in amount of vaporized DME fuel. A rise in temperature of the DME fuel will, thus, cause the valve-opening pressure acting on the regulating valve 74 to be increased, thereby elevating the internal pressure of the fuel gallery 70 to reduce the amount of vaporized DME fuel.

The high-pressure pump 4 also includes a solenoid valve 77 which has a housing 78 secured in the upper opening of the cylinder 67 in fluid-tight fashion. The housing 78 has cut in a peripheral wall thereof an external thread which engages an internal thread cut in an inner peripheral wall of the cylinder 67 to form a fastening structure 79. An annular upper fuel gallery 81 is formed between a valve body 80 of the solenoid valve 77 and the inner wall of the upper opening of the cylinder 67. The valve body 80 of the solenoid valve 77 and the plunger 69 define a pump chamber 82 within the cylinder 67.

The upper fuel gallery 81 is filled with the DME fuel flowing out of the fuel gallery 70 through a fuel path 113 formed in a side wall of the cylinder 67. The DME fuel within the upper fuel gallery 81 flows into the pump chamber 82, as will be described later in detail, through a fuel path 83 formed in the valve body 80.

The cylinder 67 has installed therein a hollow outlet holder 84 which is equipped with the discharge valve 14, as shown in FIG. 1. The discharge valve 14 is made up of a valve member 85 and a compression coil spring 86. The compression coil spring 86 sets a valve-opening pressure at which the valve member 85 is to be opened. The discharge valve 14 communicates with the pump chamber 82 through a fuel path 87 to discharge the DME fuel from the pump chamber 82 to the common rail 5. The valve member 85 is closed in fluid-tight fashion following decreasing of the pressure within the pump chamber 82, thereby keeping the pressure within the common rail 5 at a given constant level.

The cylinder 67 has an annular withdrawal groove 88 formed in a circumference of an inner wall 67a of the cylinder 67 along which the plunger 69 slides. The annular withdrawal groove 88 communicates with a withdrawal path 89 formed in the side wall of the cylinder 67 and works to withdraw the DME fuel leaking out of the pump chamber 82 through a gap between the plunger 69 and the inner wall of the cylinder 67 into the withdrawal path 89.

The cylinder 67 also has a hollow purging screw 90 installed therein and an elongated leakage path 93 formed therein. The leakage path 93 extends vertically, as viewed in the drawing, and communicates, as clearly shown in FIG. 4, with a low-pressure leakage chamber 92 defined within a cup-shaped oil seal 91 fitted on a lower end portion of the cylinder 67 in fluid-tight fashion.

The DME fuel of a lower pressure leaking out of the withdrawal groove 88 through a gap between the plunger 69 and the inner wall of the cylinder 67 enters the low-pressure leakage chamber 92. The DME fuel stored in the low-pressure leakage chamber 92 is discharged from the leakage path 93 to the purge tank 20 through a guide path 94 formed in the purging screw 90 and the fuel selector valve 19.

Figure 4:
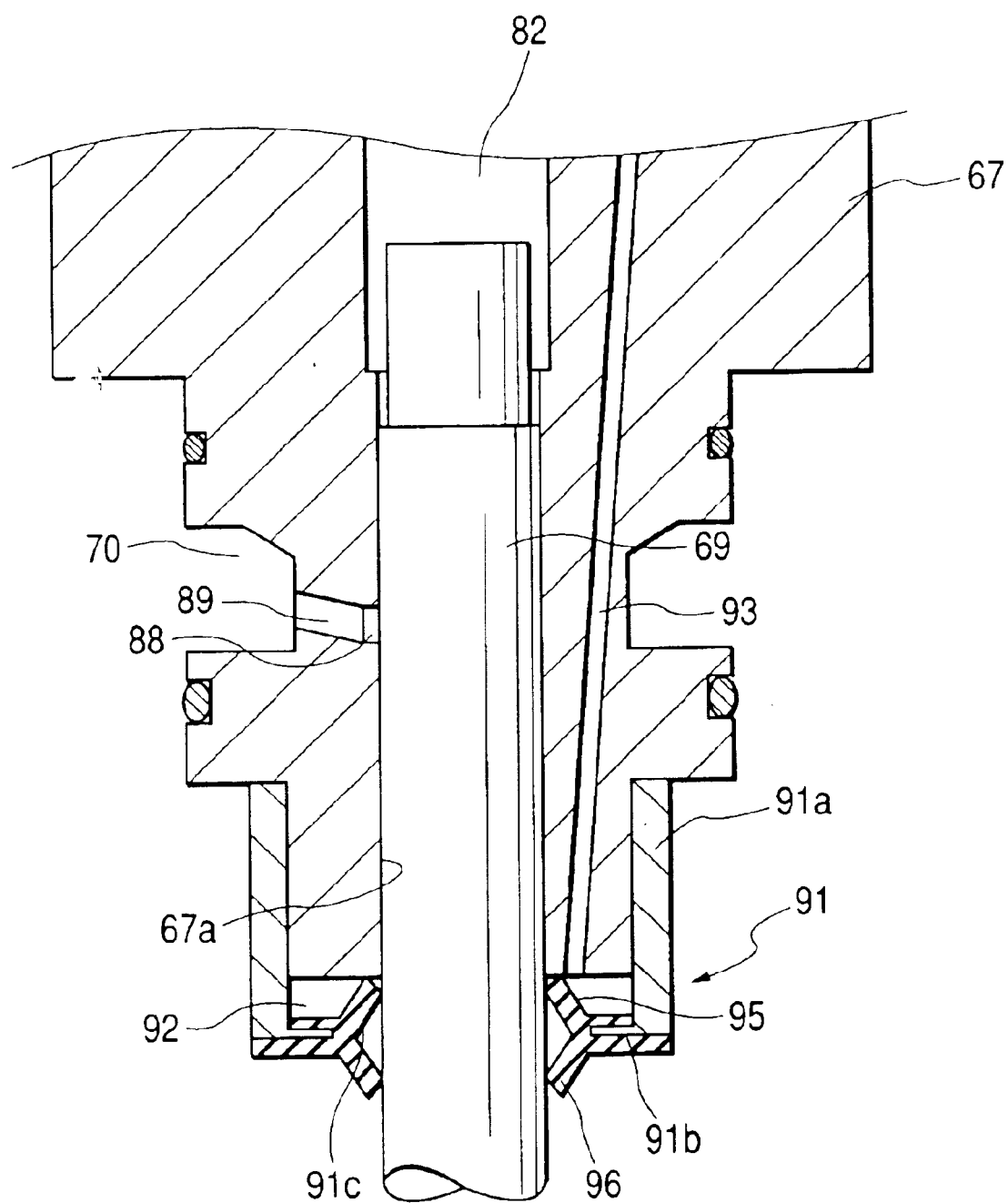
FIG. 4 is a partially enlarged sectional view of FIG. 3.

The coil seal 91 includes, as clearly shown in FIG. 4, a hollow metal cylinder 91a and a rubber disc 91b. The metal cylinder 91a is fitted on the lower end portion of the cylinder 67. The rubber disc 91b is fitted on a bottom end of the metal cylinder 91a by baking and has formed therein a hole 91c through which the plunger 69 passes. The rubber disc 91b has an upper lip 95 and a lower lip 96 which are in elastic engagement with the outer wall of the plunger 69 to form hermetic seals.

Most of the DME and lubricating oil sticking to the periphery of the plunger 69 during strokes of the plunger 69 are removed by the upper and lower lips 95 and 96 of the rubber disc 91b. The plunger 69, thus, strokes vertically with a small amount of DME fuel and lubricating oil sticking thereto.

The DME fuel removed by the upper lip 95 is stored in the low-pressure leakage chamber 92 and then returned to the purge tank 20 through the leakage path 93 and the guide path 94 in the purging screw 90. The lubricating oil removed by the lower lip 96 is returned back to the cam chamber 62a of the housing 62 through a clearance between the inner wall of the housing 62 and the tappet 65.

Figure 6:
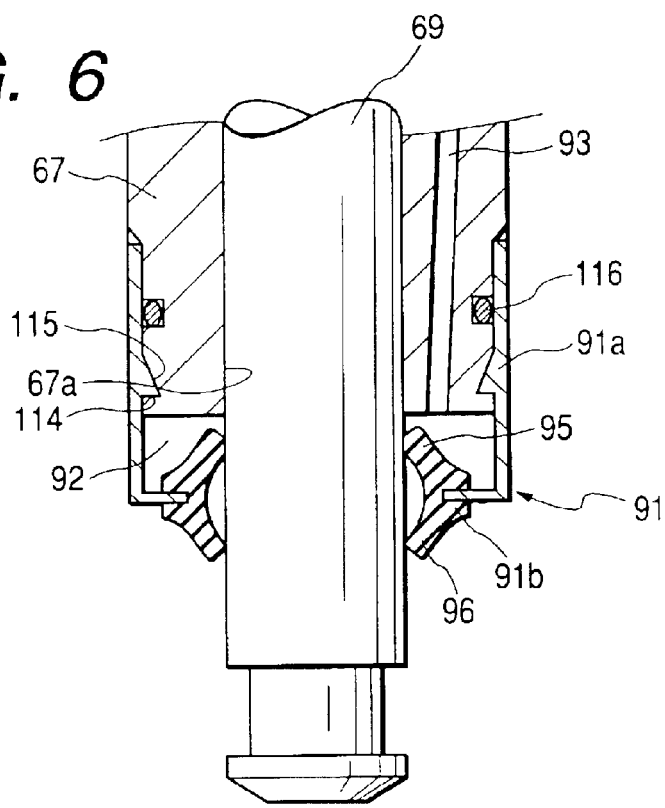
FIG. 6 is a partially enlarged view which shows a first modification of a sealing structure of the high-pressure pump, as illustrated in FIG. 3.

The coil seal 91 may be joined tightly to the cylinder 67, as shown in FIG. 6, using a lock mechanism. Specifically, the cylinder 67 has an annular V-shaped groove 114 formed in the lower end portion thereof. The metal cylinder 91a has an annular barb-like protrusion 115 which is fitted in the groove 114 of the cylinder 67 to establish tight engagement of the oil seal 91 with the cylinder 67. An O-ring 116 is installed between the inner wall of the metal cylinder 91a and the outer wall of the cylinder 67 to establish fluid-tight sealing therebetween. The structure of FIG. 6 enables undesirable deformation of the plunger 69 arising from press-fitting of the metal cylinder 91a on the plunger 69 in the structure of FIG. 1 to be eliminated, which minimizes a change in dimension of the clearance between the plunger 69 and the cylinder 67, thus resulting in improved reliability of the high-pressure pump 4.

Figure 7:
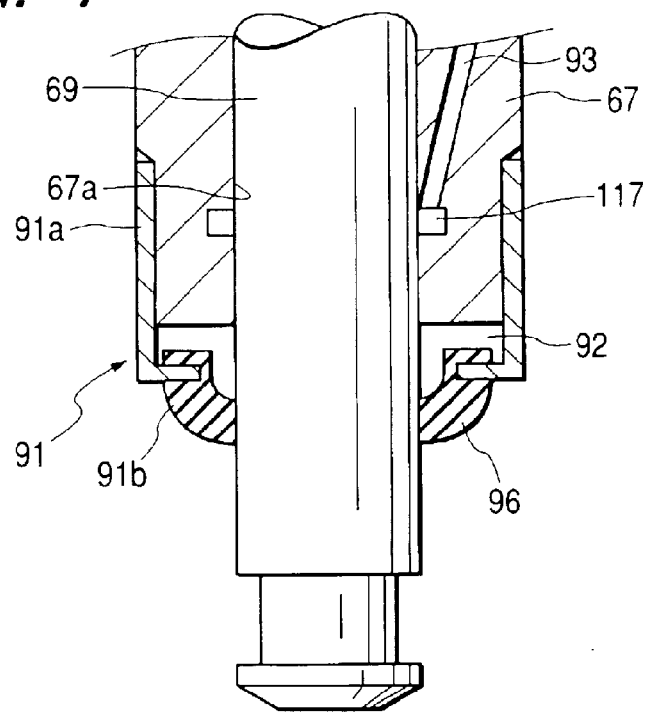
FIG. 7 is a partially enlarged view which shows a second modification of a sealing structure of the high-pressure pump, as illustrated in FIG. 3.

FIG. 7 shows a second modified structure of the high-pressure pump 4.

The cylinder 67 also has a second withdrawal groove 117 formed in the inner wall 67a beneath the withdrawal groove 88. The oil seal 91 has only the lower lip 96. The second withdrawal groove 117 communicates with the leakage path 93. The illustrated structure works to withdraw the DME fuel of lower pressure from the outer periphery of the plunger 69 through the withdrawal groove 117, thus eliminating the need for the upper lip 95 of the rubber disc 91b. This results in a decrease in length of a portion of the plunger 69 sliding in contact with the rubber disc 91b.

Figure 5:
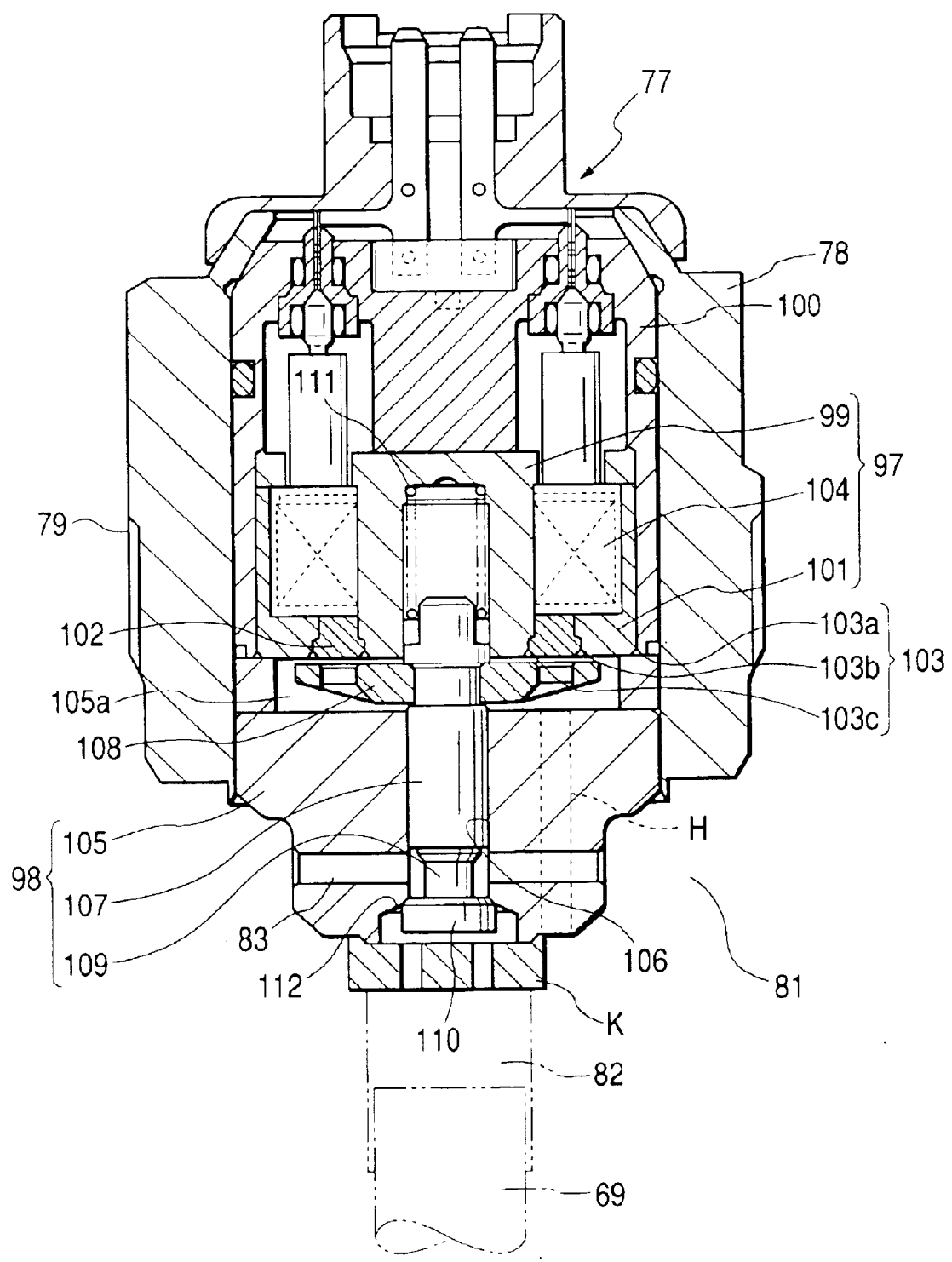
FIG. 5 is an enlarged sectional view which shows an internal structure of a solenoid valve installed in the high-pressure pump illustrated in FIG. 3.

FIG. 5 shows an internal structure of the solenoid valve 77.

The solenoid valve 77 consists of a solenoid assembly 97 and a valve assembly 98. The solenoid assembly 97 includes a coil 104 and cores 99 and 101 which are arranged coaxially with each other and a non-magnetic member 102 disposed between the cores 99 and 101. The cores 99 and 101 are disposed within a solenoid casing 100 made up of a non-magnetic material. The cores 99 and 101 are joined to the non-magnetic member 102 in fluid-tight fashion by welding forming annular beads 103 (103b and 103c).

The core 101 is joined to the solenoid casing 100 through an annular bead 103a. The annular beads 103 and 103a establish a highly rigid and hermetically sealed structure of the solenoid valve 77 which avoids the entrance of the DME fuel of higher pressure into the coil 104 interposed between the cores 99 and 101.

The valve assembly 98 includes a valve body 105 and a needle 107. The needle valve 107 is slidable within a longitudinal valve chamber 106 formed in the valve body 105. The needle 107 has an armature 108 joined on an upper end thereof and a small-diameter portion 109 formed in a lower end portion thereof to define a valve head 110.

The valve body 105 has formed therein a pressure drain H communicating between the fuel gallery 81 and an armature chamber 105a. A stopper plate K is attached to the lower end of the valve body 105. The stopper plate K works to define a lower limit of a stroke of the valve head 110 and has formed therein holes through which the DME fuel is allowed to pass.

When the solenoid valve 77 is energized, it will cause the armature 108 and the solenoid assembly 97 to form a magnetic circuit which produces an attractive force acting on the needle 107. The needle 107 is, thus, lifted upward, as viewed in the drawing, against the mechanical pressure of a compression coil spring 111 until the valve head 110 abuts on a seat 112 formed in the valve body 105, thereby blocking fluid communication between the pump chamber 82 and the fuel path 108 leading to the upper fuel gallery 81.

When it is required to inject the DME fuel from the injectors 1, the ECU 2 picks up outputs of the pressure sensor 21 and the temperature sensor 22 to determine mechanical properties of the DME fuel such as bulk modulus of elasticity and density by look-up using a map and calculates the volume of the DME fuel as a function of a calorific value required by the diesel engine. The ECU 2 also determines the quantity of fuel injected into the diesel engine, the injection timing, and a fuel output time of the high-pressure pump 4 that is a function of the quantity of the DME fuel discharged from the high-pressure pump 4 and outputs control signals to the injectors 1 and the high-pressure pump 4.

The operation of each of the injectors 1 will be described below.

When it is required to initiate the fuel injection, the ECU 2 controls the high-pressure pump 4 to supply the DME fuel to each of the injectors 1 through the common rail 5 and the high-pressure lines 23. The ECU 2 outputs a drive pulse as a function of a required operating condition of the diesel engine to the solenoid 33 of the injectors 1 to energize the coil 53. This causes the armature 49 to be attracted upward, as viewed in FIG. 2, against the mechanical pressure of the first coil spring 31. When the current IH1 supplied from the ECU 2 to the coil 53 is relatively small so that a relation of Tf<Ef<Rf is met, the needle valve 30 is moved the first lift distance h1 and held at a first lift position (will also referred to as an intermediate lift position below) upon abutment against the spring seat 43 on which the initial set load Fs2 of the second coil spring 32 is exerted. Ef is the attractive force produced when the coil 53 is energized. Tf is the sum of the initial set load Fs1 of the first coil spring 31 and the fuel pressure acting on the tip 30a of the needle valve 30. Rf is the sum of the initial set load Fs1 of the first coil spring 31, the initial set load Fs2 of the second coil spring 32, and a mechanical pressure determined by the spring constant K1×the first lift distance h1.

When the needle valve 30 is lifted up from the seat 40 of the nozzle body 36, it opens the spray holes 54, thus initiating the fuel injection. A fuel path formed by a clearance between the tip 30a of the needle valve 30 and the seat 40 of the nozzle body 36 through which the DME fuel flows into the spray holes 54 is smaller in area than the spray holes 54, so that the DME fuel is discharged from the spray holes 54 at a lower injection rate.

When it is required to inject the DME fuel into the engine at a higher injection rate, the ECU 2 supplies a greater current IH1 to the coil 53, it will cause the solenoid 33 to produce a greater attractive force which moves the needle valve 30 upward from the intermediate lift position upon abutment of the guide member 45 against the lower end surface 48a of the plate 48. Specifically, the needle valve 30 is lifted up the second lift distance h2 from the intermediate lift position and is held at the maximum lift position located at the interval (h1+h2) away from the initial position. This cause the fuel path formed by the clearance between the tip 30a of the needle valve 30 and the seat 40 of the nozzle body 36 through which the DME fuel flows into the spray holes 54 to be greater in area than the spray holes 54, so that the DME fuel is discharged from the spray holes 54 at the higher injection rate.

After the lapse of a given period of time, the ECU 2 stops outputting the drive pulse to the coil 53. This causes the needle valve 30 to move downward. When the needle valve 30 travels the second lift distance h2 and reaches the intermediate lift position, the mechanical pressure of the second coil spring 32 acting on the needle valve 30 disappears, so that only the mechanical pressure of the first coil spring 31 acts on the needle valve 30. Specifically, the valve-closing pressure exerted on the needle valve 30 during the downward movement drops in two steps, thereby causing the needle valve 30 to decelerate and land at the tip 30a on the seat 40 of the nozzle body 36 slowly. This results in decreases in impact and mechanical noise level.

The ECU 2 may lift the needle valve 30 up to the maximum lift position from the initial position at one stroke or moves it downward immediately after reaching the intermediate lift position.

Further, the ECU 2 may hold the needle valve 30 at the intermediate position for an increased period of time and then lift it up to the maximum lift position. The ECU 2 may also decrease the length of time the needle valve 30 is moved downward from the maximum lift position and held at the intermediate or move the needle valve 30 from the maximum lift position directly to the initial position at one stroke.

The lifting up the needle valve 30 stepwise to the maximum lift position or holding the needle valve 30 at the intermediate lift position for an increased period of time at an initial stage of fuel burning results in a decreased injection rate, which decreases the quantity of nitrogen oxides (NOx) and burning noises. The decreasing or eliminating the length of time the needle valve 30 is held at the intermediate lift position after moved downward from the maximum lift position results in a sharp stop of fuel injection, thus decreasing the quantity of black smoke of exhaust emissions.

As described above, when the needle valve 30 is lifted up the first lift distance h1 and held at the intermediate lift position, the fuel path formed by the clearance between the tip 30a of the needle valve 30 and the seat 40 of the nozzle body 36 through which the DME fuel flows into the spray holes 54 is smaller, thus causing the DME fuel to be sprayed at the lower injection rate. This results in a decrease in premixed combustion within a low and middle load range of operation of the diesel engine, thus resulting in decreases in quantity of nitrogen oxides (NOx) contained in exhaust emissions and combustion noise.

When the needle valve 30 is lifted up further and held at the maximum lift position, the fuel path formed by the clearance between the tip 30a of the needle valve 30 and the seat 40 of the nozzle body 36 through which the DME fuel flows into the spray holes 54 is greater, thus causing the DME fuel to be sprayed at the higher injection rate. This higher rate injection is carried out in a high load range of operation of the diesel engine and facilitates diffusive burning, thus allowing the injection period to be shortened, which results in improvement of an engine output.

Unlike a conventional fuel injection system which requires decreasing the size of spray holes of the injector and increasing the injection pressure in order to achieve atomization of the fuel and shorten the injection duration, the structure of this embodiment is capable of controlling the injection rate easily and lowering the injection pressure to decrease an engine torque required to develop the injection pressure, thus resulting in improvement of fuel economy.

The operation of the high-pressure pump 4 will be described below in detail with reference to FIGS. 3 to 5.

When the roller 66 is on a base circle of the cam 64 installed on the cam shaft 63, the plunger 69 lies at the bottom dead center, and the solenoid valve 77 is deenergized. The needle 107 of the valve assembly 98 of the solenoid valve 77, as shown in FIG. 5, is urged downward by the first coil spring 111 and located away from the seat 112, thereby establishing the fluid communication between the upper fuel gallery 81 and the pump chamber 82 through the fuel path 83. The DME fuel pressurized by the feed pump 8, thus, flows into the fuel gallery 70 through the inlet screw 71 and the fuel path 73 and also into the upper fuel gallery 81 through the fuel path 113 formed in the side wall of the cylinder 67. The DME fuel stored in the upper fuel gallery 81 subsequently flows into the pump chamber 82 past the fuel path 83, the small-diameter portion 109 of the needle 107, and the seat 112.

When the pressure in the common rail 5 is lower than the feed pressure of the DME fuel, for example, at the start-up of the diesel engine, the feed pressure overcomes the total of the set load of the compression coil spring 86 of the discharge valve 14 of the high-pressure pump 4 and the common rail pressure, thus opening the valve member 85 against the mechanical pressure of the compression coil spring 86 to supply the DME fuel from the pump chamber 82 to the common rail 5 through the fuel path 87.

When the tappet 65 is lifted up by the convex portion 64a through the roller 66 following rotation of the cam shaft 63, the plunger 69 is moved upward against the mechanical pressure of the compression coil spring 68 to decrease the volume of the pump chamber 82. This causes the DME fuel stored in the pump chamber 82 to be elevated in pressure, so that it is discharged into the upper fuel gallery 81 through the seat 112 and the small-diameter portion 112 of the needle 107 and the fuel path 83.

When the solenoid valve 77 is energized as functions of the speeds of the diesel engine and the feed pump 8 and a throttle position of the diesel engine in the course of lifting of the cam 64, it will cause the magnetic circuit formed by the solenoid assembly 97 and the armature 102 to produce a magnetic flux, which attracts the needle 107 upward, as viewed in FIG. 5, against the mechanical pressure of the compression coil spring 111. Upon abutment of the valve head 110 of the needle 107 on the seat 112, the fluid communication between the upper fuel gallery 81 and the pump chamber 82 through the fuel path 83 is blocked.

When the convex portion 64a is further lifted up following the rotation of the cam shaft 63, it will cause the volume of the pump chamber 82 to be more decreased by the upward movement of the plunger 69, so that the pressure in the pump chamber 82 rises as functions of the decreased volume of the pump chamber 82 and the bulk modulus of elasticity of the DME fuel.

When the pressure in the pump chamber 82 overcomes the sum of the common rail pressure and the set load of the compression coil spring 86 of the discharge valve 14 during the rising of the pressure in the pump chamber 82, it will cause the valve member 85 to be opened against the mechanical pressure of the compression coil spring 86, thereby supplying the DME fuel to the common rail 5.

When the valve head 110 of the needle 107 abuts the seat 112, and the pressure in the pump chamber 82 rises to a given level, the ECU 2 deenergizes the coil 104 of the solenoid valve 77. The pressure of the DME fuel within the pump chamber 82 is greater than the mechanical pressure of the compression coil spring 111 acting on the needle 107 of the solenoid valve 77 in the valve-opening direction, so that the valve head 110 of the needle 107 is kept in constant engagement with the seat 112.

When the convex portion 64a of the cam 64 reaches the top dead center, the plunger 69 stops pressurizing the DME fuel within the pump chamber 82, so that the pressure in the pump chamber 82 begins to drop. When the convex portion 64a moves downward after the top dead center, the pressure within the pump chamber 82 drops further. The sum of the common rail pressure and the mechanical pressure of the compression coil spring 86 acts on the valve member 85 to close the fuel path 87. This causes the common rail 5 to be closed, so that the common rail pressure is kept constant.

The pressure in the pump chamber 83 continues to drop following the downward movement of the convex portion 64a of the cam 64. When the pressure in the pump chamber 82 is lowered below the mechanical pressure of the compression coil spring 111 of the solenoid valve 77, it will cause the valve head 110 of the needle 107 to be moved downward by the compression coil spring 111 away from the seat 112, thereby establishing the fluid communication between the upper gallery 81 and the pump chamber 82 through the fuel path 83. The DME fuel in the upper fuel gallery 81, thus, flows into the pump chamber 82 through the small-diameter portion 109 and the seat 112 again. When the convex portion 64a of the cam 64 reaches the bottom dead center, it completes one cycle of a stroke of the plunger 69.

During the stroke of the plunger 69, the oil seal 91, as described above, works to keep the quantity of the DME fuel and the lubricating oil sticking to the periphery of the plunger 69 constant. Specifically, when the plunger 69 is lifted up past through the hole 91c of the rubber disc 91b, the lower lip 96 serves to keep the thickness of the lubricating oil sticking to the plunger 69 at a desired value. The lubricating oil removed by the lower lip 96 from the plunger 69 is returned back to the cam chamber 62a of the housing 62.

Conversely, when the plunger 69 is moved downward past the hole 91c, the upper lip 95 serves to keep the thickness of the DME fuel sticking to the plunger 69 at a desired one. The DME fuel removed by the upper lip 95 from the plunger 69 is returned back to the low-pressure leakage chamber 92 and to the purge tank 20 through the leakage path 93 and the purging screw 90.

The DME fuel stored under high pressure within the pump chamber 82 is withdrawn to the annular withdrawal groove 88 without leaking directly into the low-pressure leakage chamber 92 and then drops in pressure below the feed pressure thereof because the annular withdrawal groove 88 leads to the fuel gallery 70 through the withdrawal path 89. The part of the DME fuel within the annular withdrawal groove 88 leaks into the low-pressure leakage chamber 92 past the gap between the periphery of the plunger 69 and the inner wall of the cylinder 69 and is returned to the purge tank 20. Specifically, the part of the DME fuel within the annular withdrawal groove 88 is decreased in pressure stepwise and withdrawn to the purge tank 20 through the low-pressure leakage chamber 92. This results in a decrease in vaporized quantity of the DME fuel during such a pressure drop, thereby decreasing in total amount of the DME fuel leaking out of the high-pressure pump 4. This ensures a desired amount of the DME fuel to be supplied from the high-pressure pump 4 to the common rail 5, thus resulting in improvement of an engine output per fuel consumption.

The cores 99 and 101 and the non-magnetic member 102 of the solenoid valve 77 are joined hermetically by the beads 103 and 103a. This achieves the highly rigid and fluid-tight structure of the solenoid valve 77, thus enabling the high-pressure pump 4 to withstand a high feed pressure of the DME fuel, which allows the DME fuel to be used which has a lower viscosity and is easy to vaporize as required as desired properties of an alternative fuel for diesel engines.

Figure 8:
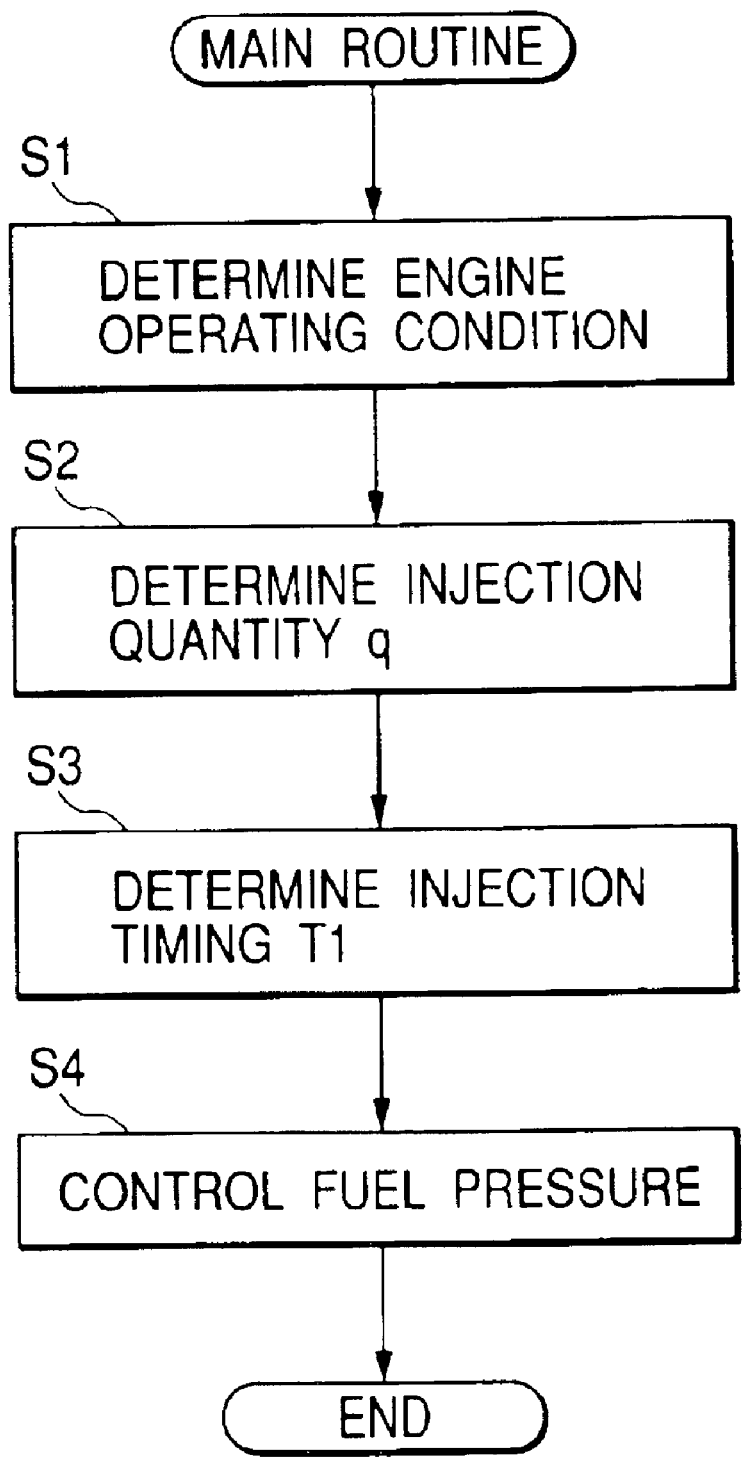
FIG. 8 is a flowchart of a main program executed in a fuel supply system.

FIG. 8 shows a main program or sequence of logical steps performed by the fuel injection system with which the fuel supply system of this embodiment is used.

After entering the program, the routine proceeds to step 1, wherein the ECU 2 determines operating conditions of the diesel engine such as engine speed, engine load (i.e., a position of an accelerator pedal), and temperature of an engine cooling water using outputs of sensors (not shown) in a known manner. The routine proceeds to step 2 wherein the quantity q of the DME fuel to be injected to the engine is determined which meets the operating conditions. The routine proceeds to step 3 wherein the injection timing T1 is determined. The routine proceeds to step 4 wherein a required pressure of the DME fuel is determined. The ECU 2 produces control signals based on parameters as determined in the above steps and outputs them to the high-pressure pump 4 and the injectors 1.

Figure 9:
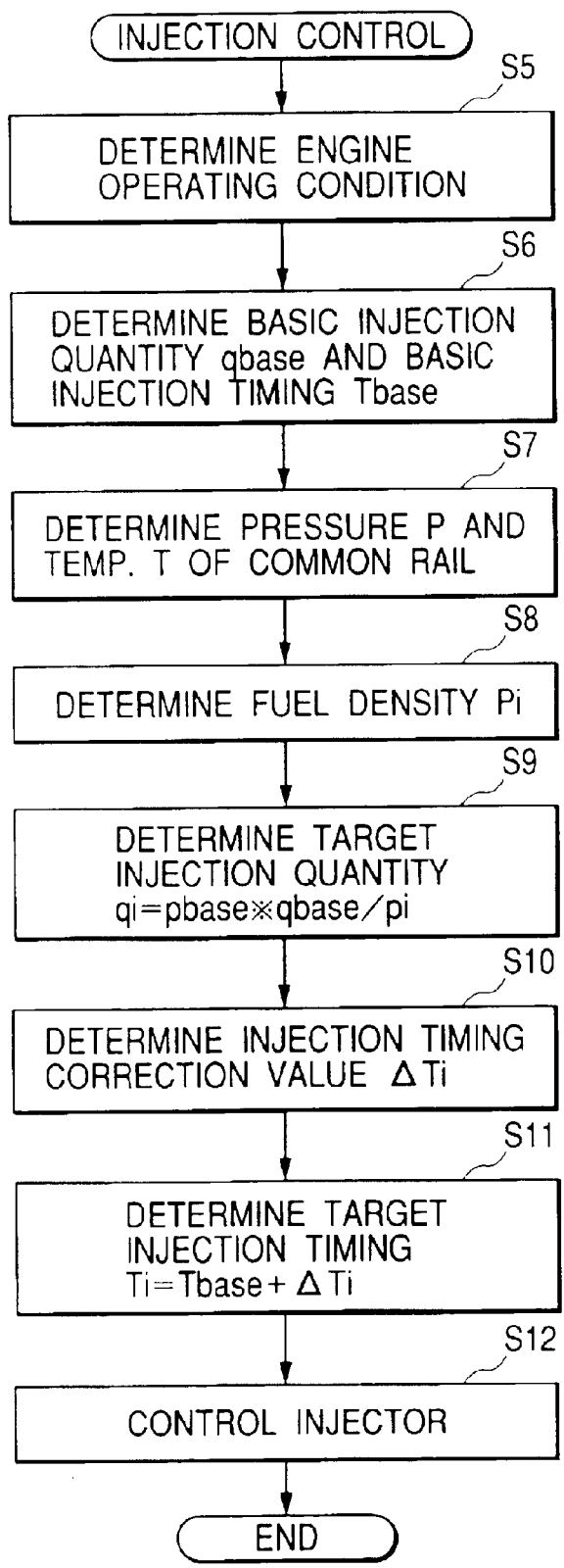
FIG. 9 is a flowchart of a program executed to control injectors.
Figure 9:
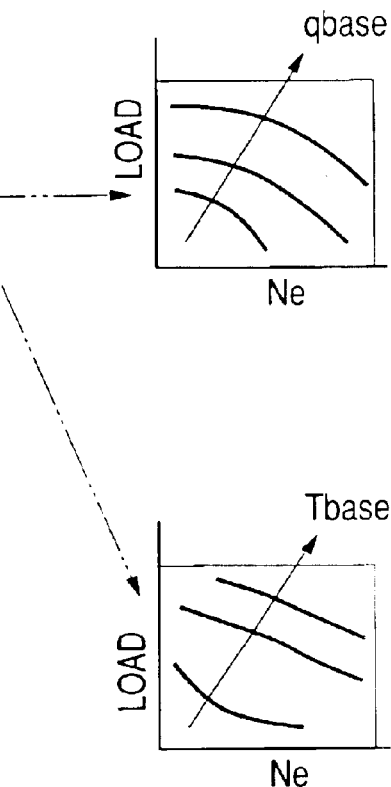

FIG. 9 shows an injector control sub-program executed in the main program of FIG. 8 in detail.

First, in step 5, the operating conditions of the diesel engine are determined using outputs of the sensors in the known manner. Next, the routine proceeds step 6 wherein the speed Ne and load of the diesel engine are derived to determine a basic injection quantity qbase and a basic injection timing Tbase by look-up using speed-to-load maps, as illustrated on the right side of FIG. 9.

The routine proceeds to step 7 wherein the pressure P and the temperature T in the common rail 5 are read out of the pressure sensor 21 and the temperature sensor 22.

Figure 10:
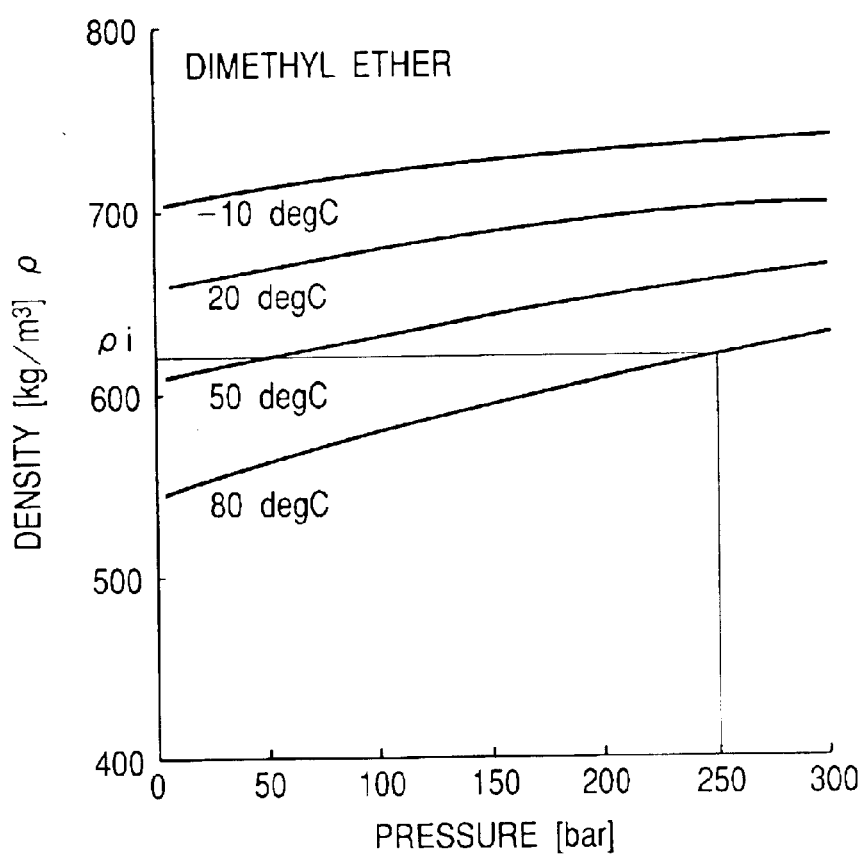
FIG. 10 is a map used to determine the density of DME fuel in terms of pressure and temperature thereof.

The routine proceeds to step 8 wherein the density $\rho i$ of the DME fuel is determined as functions of the common rail pressure P and the common rail temperature T as derived in step 7 by look-up using a two-dimensional map, as shown in FIG. 10. The basic density $\rho$ base of the DME fuel is also determined using the map based on predetermined reference parameters. The routine proceeds to step 9 wherein the basic injection quantity qbase is corrected to determine a target injection quantity qi according to a relation of $qi = \rho \text{ base} \times qbase/\rho i$.

Figure 11:
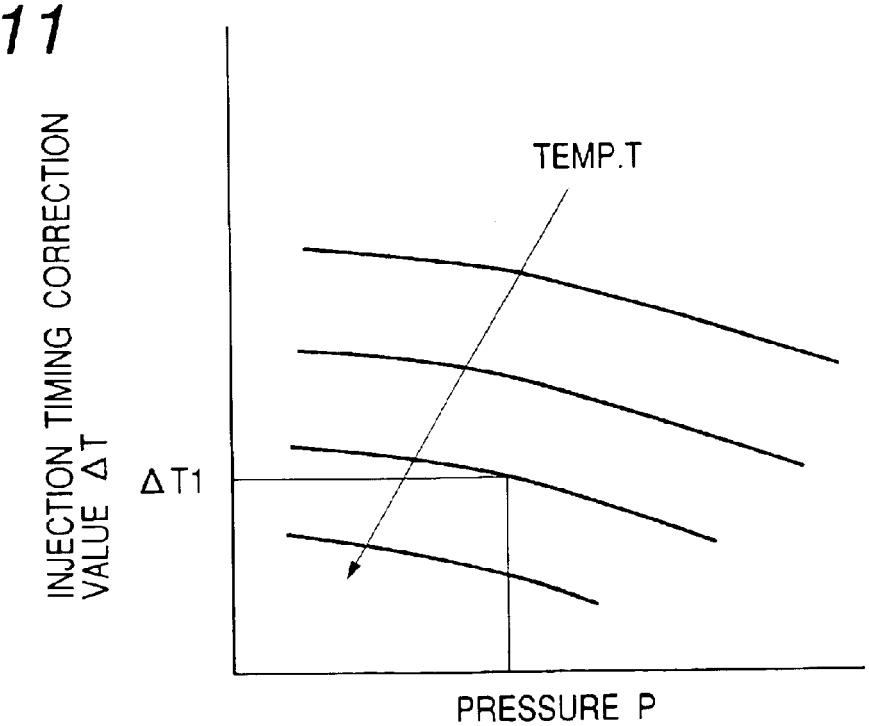
FIG. 11 is a map used to determine an ignition timing correction value as functions of pressure and temperature of DME fuel.

The routine proceeds to step 10 wherein an injection timing correction value $\Delta Ti$ is determined as functions of the common rail pressure P and the common rail temperature T by look-up using a correction map, as shown in FIG. 11. The routine proceeds to step 11 wherein a target injection timing Ti is determined according to a relation of $Ti = Tbase + \Delta Ti$.

The routine proceeds to step 12 wherein the ECU 2 produces injector control signals required to establish the target injection quantity qi and the target injection timing Ti and outputs them to the injectors 1 in the form of drive pulses through the EDU3.

Figure 12:
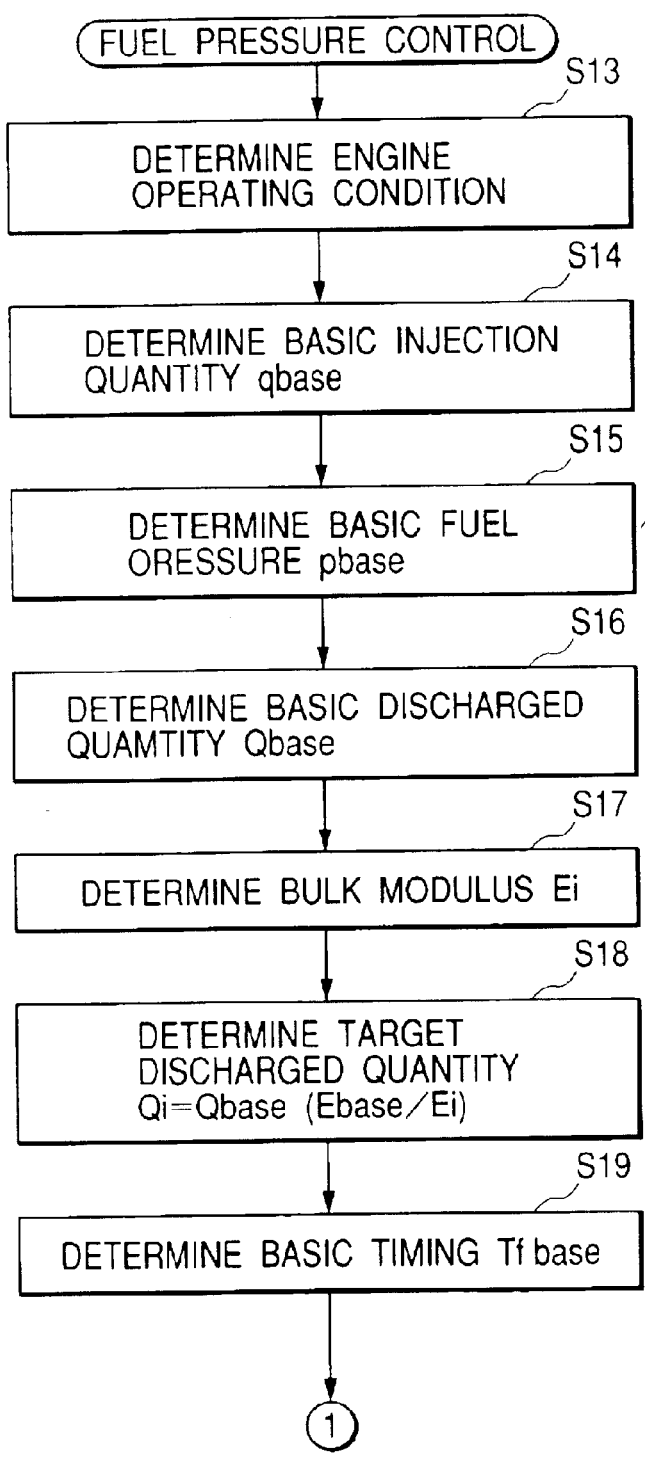
FIGS. 12 and 13 show a flowchart of a program executed to control a high-pressure pump.
Figure 12:
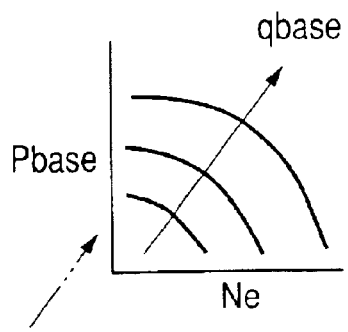
Figure 12:
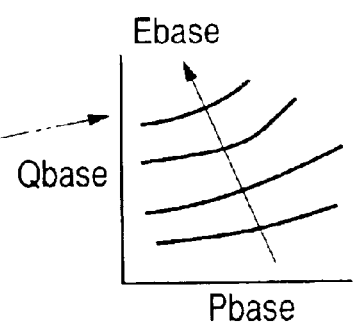
Figure 12:
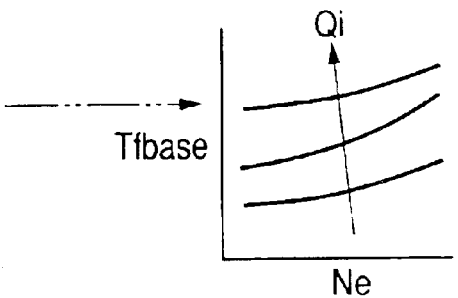
Figure 13:
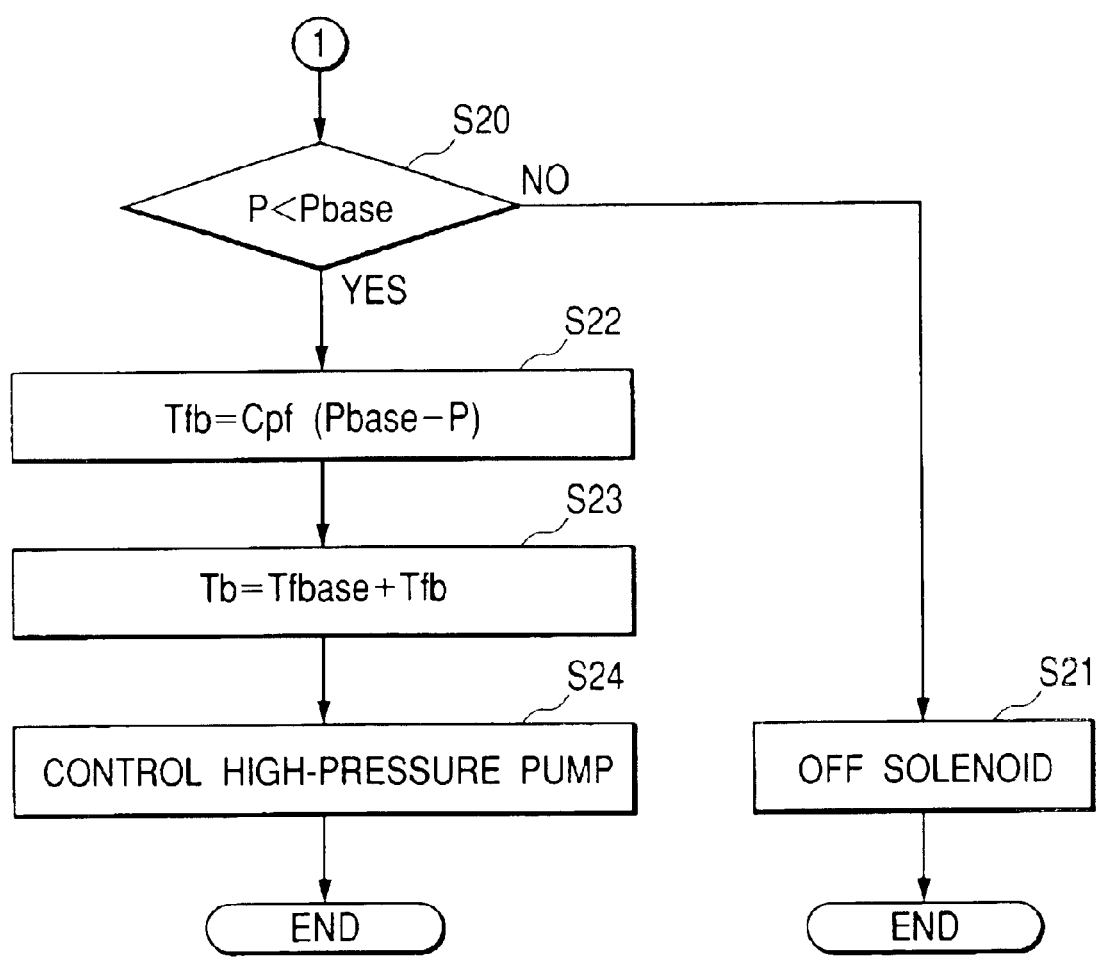

FIGS. 12 and 13 show a fuel supply pressure control sub-program executed in the main program of FIG. 8 to actuate the high-pressure pump 4 in detail.

First, in step 13, the required operating condition of the diesel engine is determined using outputs of the sensors in the known manner. Next, the routine proceeds step 14 wherein the speed Ne and load of the diesel engine are derived to determine the basic injection quantity qbase.

The routine proceeds to step 15 wherein a basic fuel pressure Pbase is determined by look-up using a speed-to-injection quantity map, as illustrated on the right side of FIG. 12, as functions of the engine speed Ne and the basic injection quantity qbase.

The routine proceeds to step 16 wherein a basic discharged quantity Qbase of the DME fuel is determined as functions of the basic fuel pressure Pbase and a basic bulk modulus of elasticity Ebase of the DME fuel by look-up using a basic fuel pressure-to-bulk modulus map, as illustrated on the right side of FIG. 12. The basic bulk modulus of elasticity Ebase is a bulk modulus of elasticity of the DME fuel when it is in a standard steady.

Figure 14:
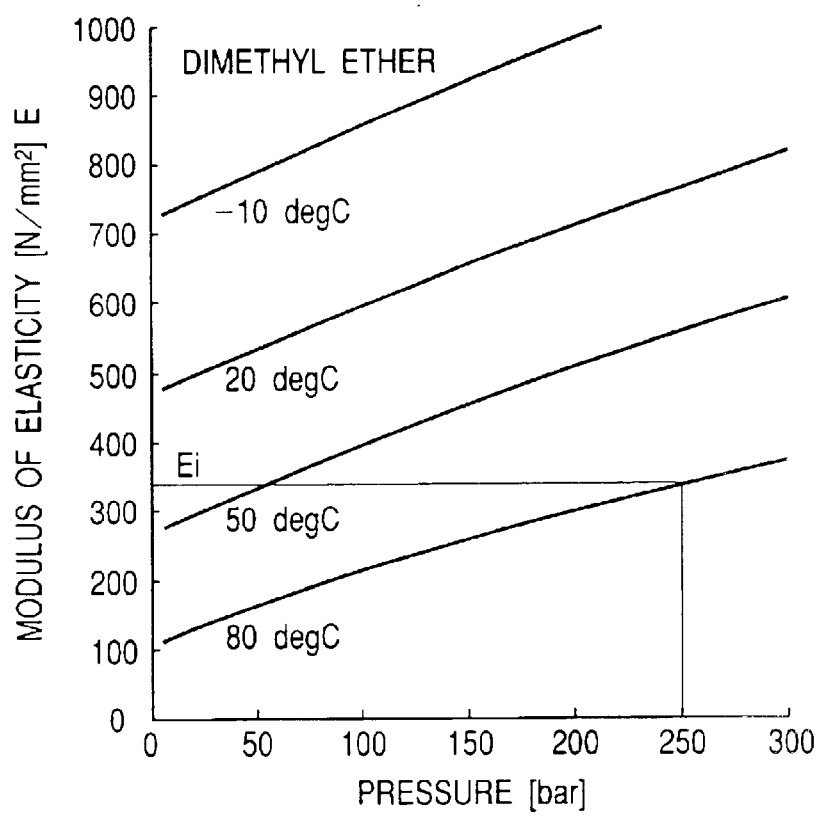
FIG. 14 is a map used to determine the bulk modulus of elasticity of DME fuel in terms of pressure and temperature thereof.

The routine proceeds to step 17 wherein a bulk modulus of elasticity Ei of the DME fuel is determined as functions of the basic fuel pressure Pbase and the temperature T in the common rail 5 by look-up using a pressure-to-temperature map, as illustrated in FIG. 14.

The routine proceeds to step 18 wherein a target discharged quantity Qi of the DME fuel is determined according to a relation of $Qi = Qbase \times Ebase/Ei$.

The routine proceeds to step 19 wherein a basic timing Abase where the solenoid valve 77 of the high-pressure pump 4 is to be energized is determined as functions of the target discharged quantity Qi and the engine speed Ne by look-up using a speed-to-discharged quantity map, as illustrated on the right side of FIG. 12.

The routine proceeds to step 20, as shown in FIG. 13, wherein it is determined whether the actual pressure P as measured by the pressure sensor 21 is smaller than the basic fuel pressure Pbase, as derived in step 15, or not. If a NO answer is obtained meaning that $P \geq Pbase$, then the routine proceeds to step 21 wherein no signal is outputted to the solenoid valve 77.

Alternatively, if a YES answer is obtained meaning that $P < Pbase$, then the routine proceeds to step 22 wherein a correction timing Tfb is determined by multiplying a difference between the basic fuel pressure Pbase and the actual pressure P by a given coefficient Cpf(i.e., Tfb=Cpf (Pbase−P).

The routine proceeds to step 23 wherein a target timing Tb where the solenoid valve 77 is to be energized is determined by adding the correction timing Tfb, as determined in step 22, to the basic timing Tfbase, as determined in step 19.

The routine proceeds to step 24 wherein the high-pressure pump 4 is energized at the target timing Tb.

Figure 15:
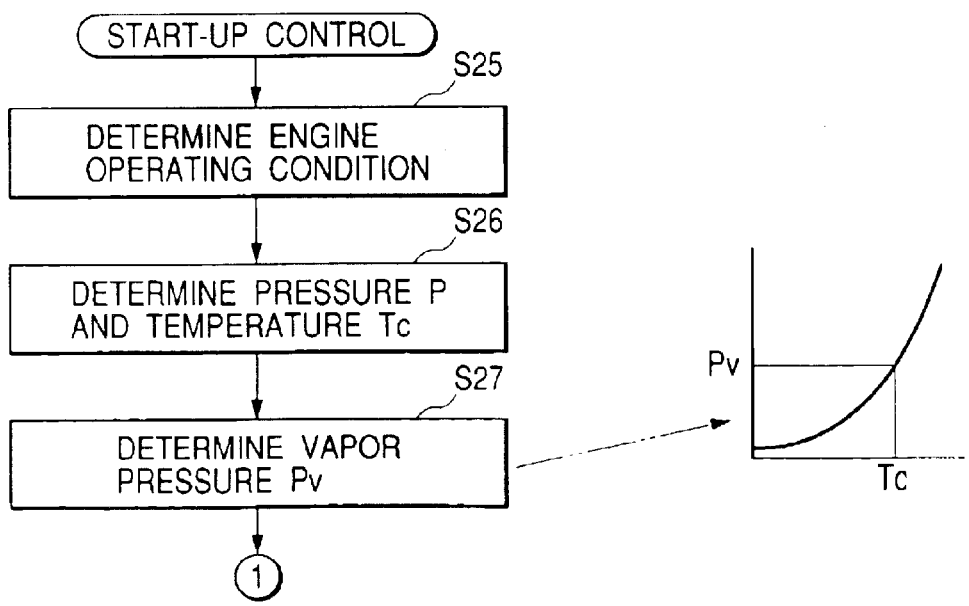
FIGS. 15, 16, and 17 show a flowchart of a program executed to control the pressure of DME fuel at the start-up of a diesel engine.
Figure 16:
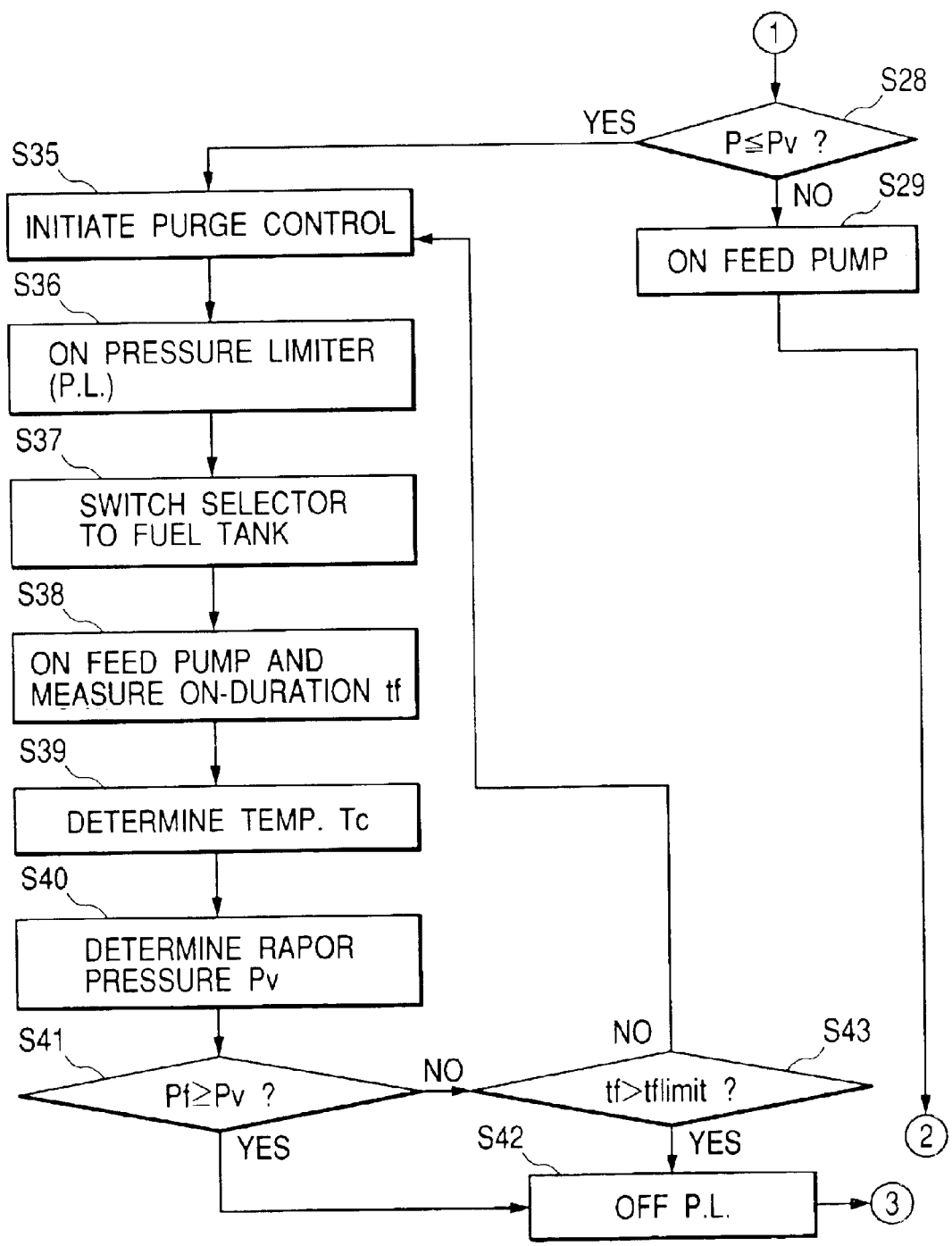
Figure 17:
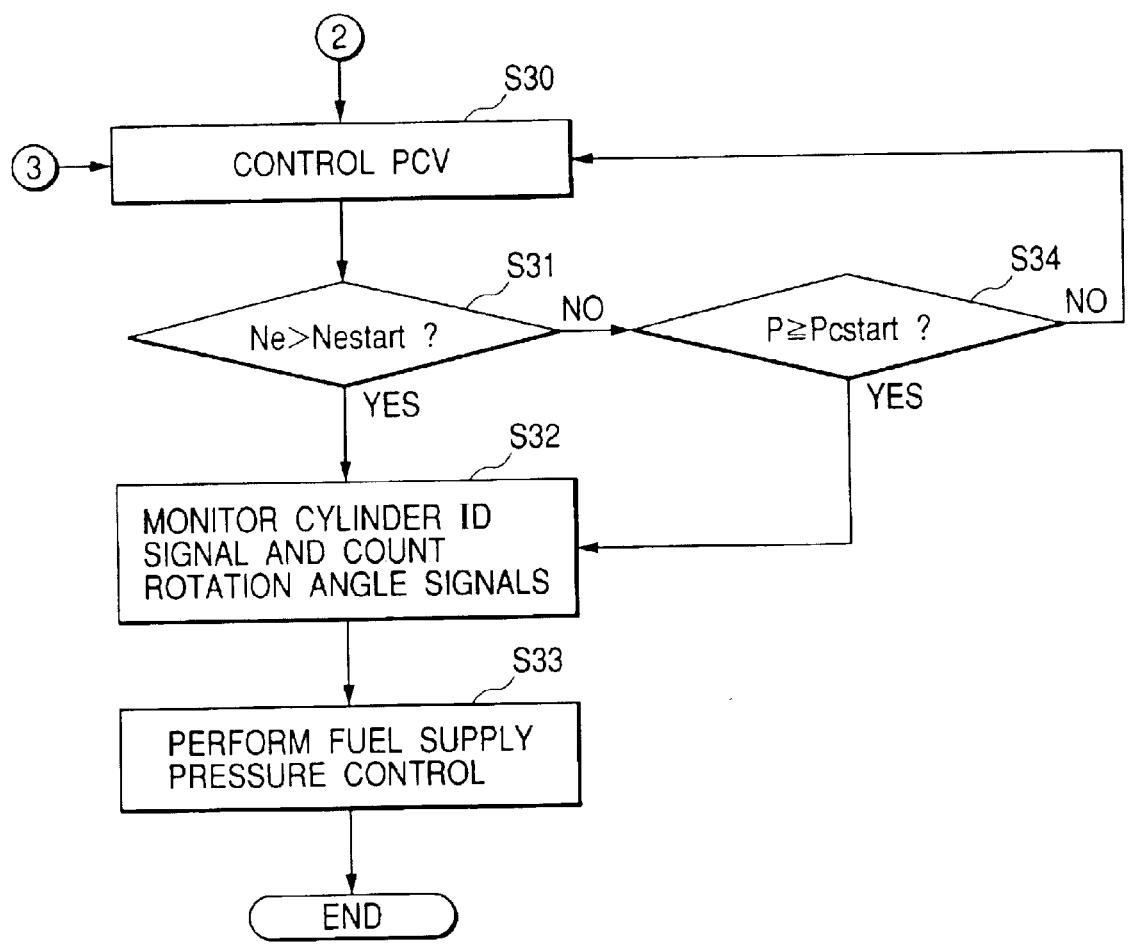

FIGS. 15 to 17 shows a fuel supply pressure control sub-program executed in the main program of FIG. 8 to actuate the high-pressure pump 4 at the start-up of the diesel engine.

After entering the program, the routine proceeds to step 25 wherein the operating conditions of the diesel engine are monitored using outputs of the sensors to determine whether the diesel engine is in a start-up mode or not. If it is determined that the diesel engine is in the start-up mode, the routine proceeds to step 26 wherein the pressure P and the temperature Tc of the DME fuel, as measured by the pressure sensor 21 and the temperature sensor 22, are determined from outputs of the pressure and temperature sensors 21 and 22.

The routine proceeds to step 27 wherein a vapor pressure Pv of the DME fuel is determined as a function of the temperature Tc by look-up using a temperature-to-vapor pressure map, as illustrated on the right side of FIG. 15.

The routine proceeds to step 28, as shown in FIG. 16, wherein it is determined whether the pressure P is lower than or equal to the vapor pressure Pv or not. If a NO answer is obtained meaning that the pressure P is higher than the vapor pressure Pv, then the routine proceeds to step 29 wherein the feed pump 8 is energized to feed the DME fuel to the high-pressure pump 4.

After step 29, the routine proceeds to step 30, as shown in FIG. 17, wherein the duty cycle of a drive pulse is controlled to turn on and off the solenoid valve 77, as labeled "PCV" (Pressure Control Valve) in the drawing, of the high-pressure pump 4 cyclically to control a maximum quantity of the DME fuel discharged from the high-pressure pump 4.

The routine proceeds to step 31 wherein it is determined whether it is determined whether the speed Ne of the diesel engine is higher than a preselected start-up speed limit Nestart or not. If a YES answer is obtained meaning that Ne>Nestart, then the routine proceeds to step 32 wherein a cylinder identification signal G is monitored, and rotational angle signals Np are counted to determine the speed Ne of the diesel engine and an angular position of the plunger 69 of the high-pressure pump 4 which is used in the program of FIG. 12 to determine the time the solenoid valve 77 is to be closed. The cylinder identification signal G and the rotational angle signal Np are well known in the art, and explanation thereof in detail will be omitted here. For instance, U.S. Pat. Nos. 6,341,253 and 4,642,773 teach such cylinder identification signal and rotational angle signal, and disclosure of which is incorporated herein by reference.

After step 32, the routine proceeds to step 33 wherein the fuel supply pressure control sub-program, as illustrated in FIGS. 12 and 13, is initiated.

If a NO answer is obtained in step 31 meaning that the speed Ne of the diesel engine is lower than or equal to the preselected start-up speed limit Nestart, then the routine proceeds to step 34 wherein it is determined whether the pressure P of the DME fuel is higher than or equal to a set start-up pressure Pcstart or not. If a YES answer is obtained meaning that $P \geq Pcstart$, then the routine proceeds to step 32. Alternatively, if a NO answer is obtained, then the routine returns back to step 30.

Referring back to FIG. 16, if a YES answer is obtained in step 28 meaning that the pressure P of the DME fuel is lower than or equal to the vapor pressure Pv, then the routine proceeds to step 35 wherein a purge control operation is initiated. The routine proceeds to step 36 wherein the ECU 2 opens the pressure limiter 24 installed in the common rail 5 to relieve gasses from the common rail 5. The routine proceeds to step 37 wherein the ECU 2 switches the fuel selector valve 18 to establish the fluid communication between the return line 26 and the fuel tank 7.

The routine proceeds to step 38 wherein the feed pump 8 is turned on to feed the DME fuel to the high-pressure pump 4, and an on-duration tf of the feed pump 8 is measured. At this time, the solenoid valve 77 of the high-pressure pump 4 is in the on-state, thus lifting up the valve head 110 of the needle 107, so that the DME fuel flows from the pump chamber 82 to the discharge valve 14 through the fuel path 87 under the feed pressure. The DME fuel pushes the valve member 85 against the mechanical pressure of the compression coil spring 86 to open it, thereby feeding the DME fuel to the common rail 5. The DME fuel enters the common rail 5 while cooling it, flows out of the pressure limiter 24, and returns back to the fuel tank 7 through the return line 25.

The routine proceeds to step 39 wherein the temperature Tc of the DME fuel within the common rail 5 is read out of the temperature sensor 22. The routine proceeds to step 40 wherein the vapor pressure Pv of the DME fuel is determined again in the same manner as in step 27. The routine proceeds to step 41 wherein it is determined whether a feed pressure Pf is higher than or equal to the vapor pressure Pv or not. The feed pressure Pf is the pressure produced by the feed pump 8, preferably an input pressure of the pump 4 and may be determined using a pressure sensor (not shown) or calculated using a controlled feed pump operating condition. If a YES answer is obtained meaning that the feed pressure Pf is higher than or equal to the vapor pressure Pv, then the routine proceeds to step 42 wherein the pressure limiter 24 is turned off. After step 42, the routine proceeds to step 30 of FIG. 17 to control, as described already, the duty cycle of the drive pulse provided to the solenoid valve 77.

Alternatively, if a NO answer is obtained in step 41 meaning that the feed pressure Pf is lower than the vapor pressure Pv, then the routine proceeds to step 43 wherein it is determined whether the on-duration tf of the feed pump 8, as determined in step 38, is longer than a preselected time limit tflimit or not. If a YES answer is obtained, then the routine proceeds to step 42. Alternatively, if a NO answer is obtained, then the routine returns back to step 35 and continues the purge control operation.

Figure 18:
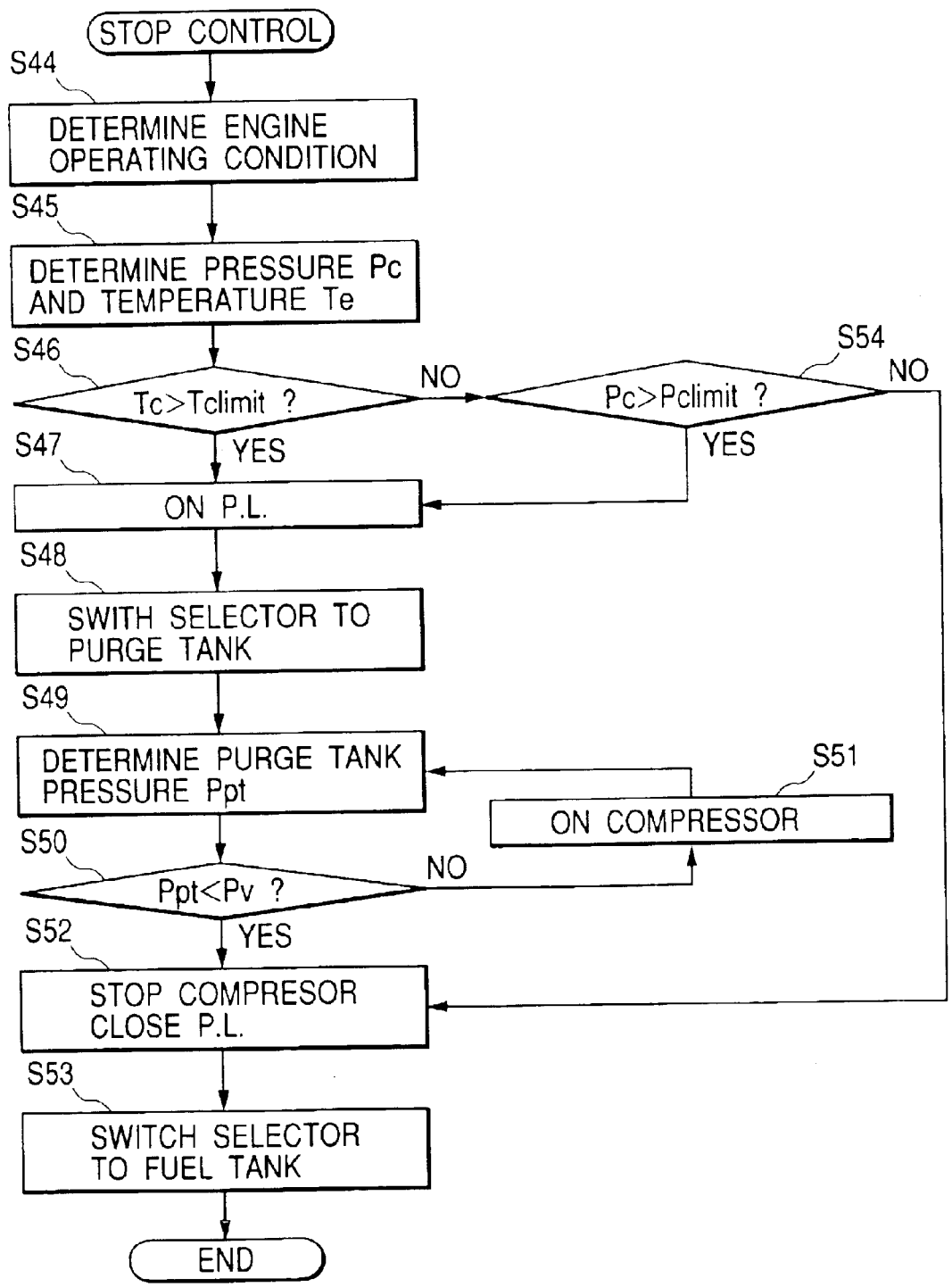
FIG. 18 is a flowchart of a program executed to control the pressure of DME fuel when a diesel engine is stopped.

FIG. 18 shows a fuel supply pressure control sub-program executed in the main program of FIG. 8 when it is required to stop feeding the DME fuel.

First, in step 44, the operating conditions of the diesel engine are determined using outputs of the sensors. Next, the routine proceeds to step 45 wherein the pressure Pc and the temperature Tc of the common rail 5 are determined from outputs of the pressure and temperature sensors 21 and 22.

The routine proceeds to step 46 wherein it is determined whether the temperature Tc of the common rail 5 is higher than a common rail temperature limit Tclimit or not. If a YES answer is obtained meaning that Tc>Tclimit, then the routine proceeds to step 47 wherein the pressure limiter 24 is turn on so that it is opened. The routine proceeds to step 48 wherein the fuel selector valve 18 is switched to establish the fluid communication between the return line 26 and the purge tank 20.

The routine proceeds to step 49 wherein the pressure Ppt within the purge tank 20 is determined using an output of a pressure sensor (not shown) installed in the purge tank 20. The routine proceeds to step 50 wherein it is determined whether pressure Ppt is lower the vapor pressure Pv of the DME fuel or not. If a NO answer is obtained meaning that the pressure Ppt is higher than the vapor pressure Pv, then the routine proceeds to step 51 wherein the compressor 27 is turned on to feed the DME fuel stored within the purge tank 20 to the fuel tank 7. The routine proceeds to step 49 wherein the pressure Ppt in the purge tank 20 is measured again.

Alternatively, if a YES answer is obtained in step 50 meaning that the pressure Ppt is lower than the vapor pressure Pv, then the routine proceeds to step 52 wherein the compressor 27 is stopped, and the pressure limiter 24 is closed.

The routine proceeds to step 53 wherein the fuel selector valve 18 is switched to establish the fluid communication between the return line 26 and the fuel tank 7.

If a NO answer is obtained in step 46 meaning that the temperature Tc in the common rail 5 is lower than the common rail temperature limit Tclimit, then the routine proceeds to step 54 wherein it is determined whether the pressure Pc in the common rail 5 is higher than a preselected common rail pressure limit Pclimit or not. If a YES answer is obtained meaning that the pressure Pc is higher than the common rail pressure limit Pclimit, then the routine proceeds to step 47 to open the pressure limit 24. Alternatively, if a NO answer is obtained meaning that the pressure Pc is lower than the common rail pressure limit Pclimit, then the routine proceeds to step 53 to connect the return line 18 to the fuel tank 7 through the fuel selector valve 18.

Figure 19:
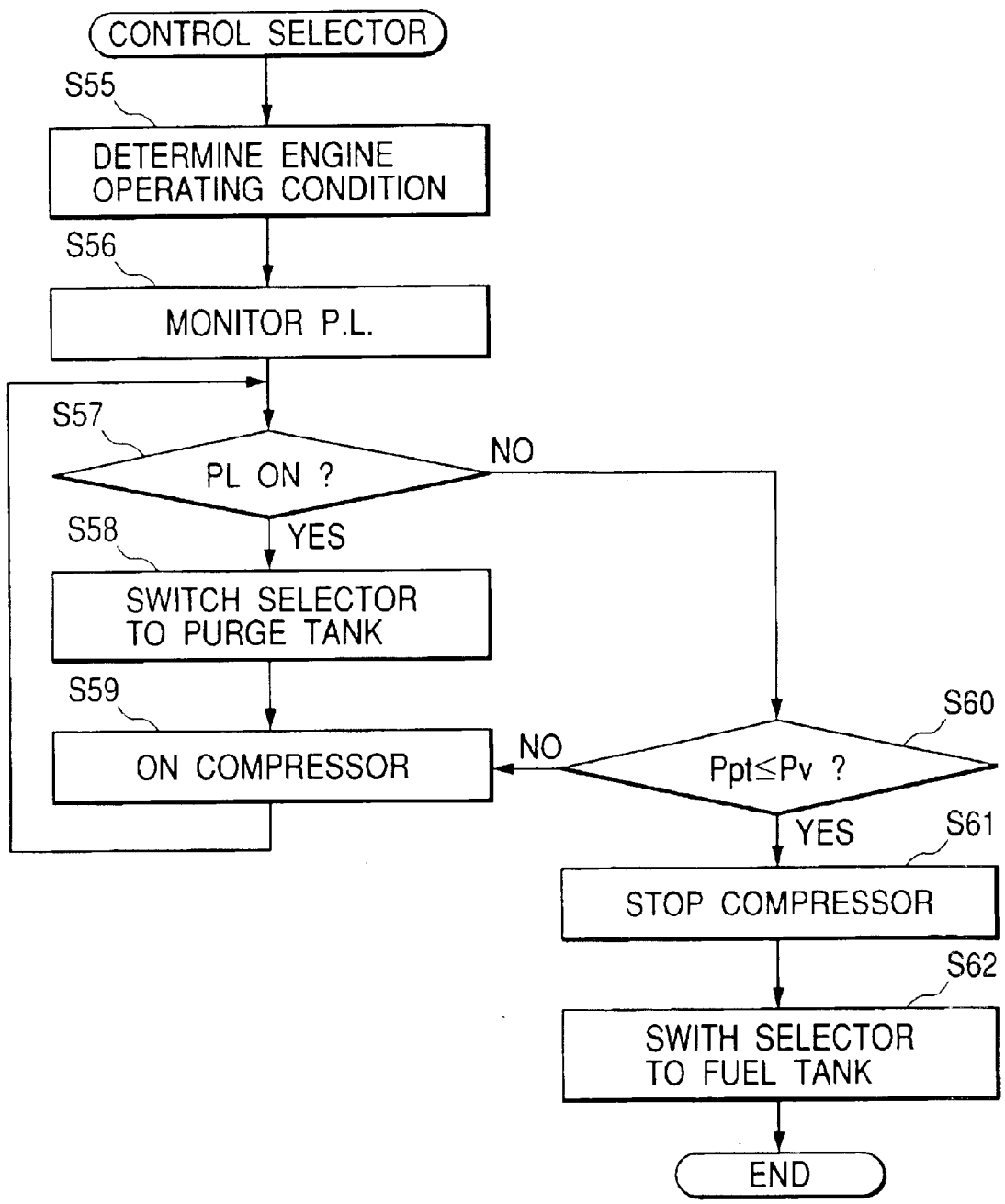
FIG. 19 is a flowchart of a program executed to control a fuel selector valve 18.

FIG. 19 shows a control program for the fuel selector valve 18 executed when the diesel engine is not stopped.

First, in step 55, the operating conditions of the diesel engine are determined from outputs of the sensors. Next, the routine proceeds to step 56 wherein the status of the pressure limiter 24 is monitored. The routine proceeds to step 57 wherein it is determined whether the pressure limiter 24 is in the on-state or not. If a YES answer is obtained meaning that the pressure limiter 24 is in the on-state, so that it is opened, then the routine proceeds to step 58 wherein the fuel selector valve 18 is switched to establish the fluid communication between the return line 26 and the purge tank 20. The routine proceeds to step 59 wherein the compressor 27 is actuated and then returns back to step 57.

If a NO answer is obtained in step 57 meaning that the pressure limiter 24 is closed, then the routine proceeds to step 60 wherein it is determined whether the pressure Ppt in the purge tank 20 is lower than or equal to the vapor pressure Pv of the DME fuel or not. If a NO answer is obtained meaning that the pressure Ppt is higher than the vapor pressure Pv, then the routine proceeds to step 59 to actuate the compressor 27. Alternatively, if a YES answer is obtained, then the routine proceeds to step 61 wherein the compressor 27 is turned off. The routine proceeds to step 62 wherein the fuel selector valve 18 is switched to establish the fluid communication between the return line 26 and the fuel tank 7.

Figure 20:
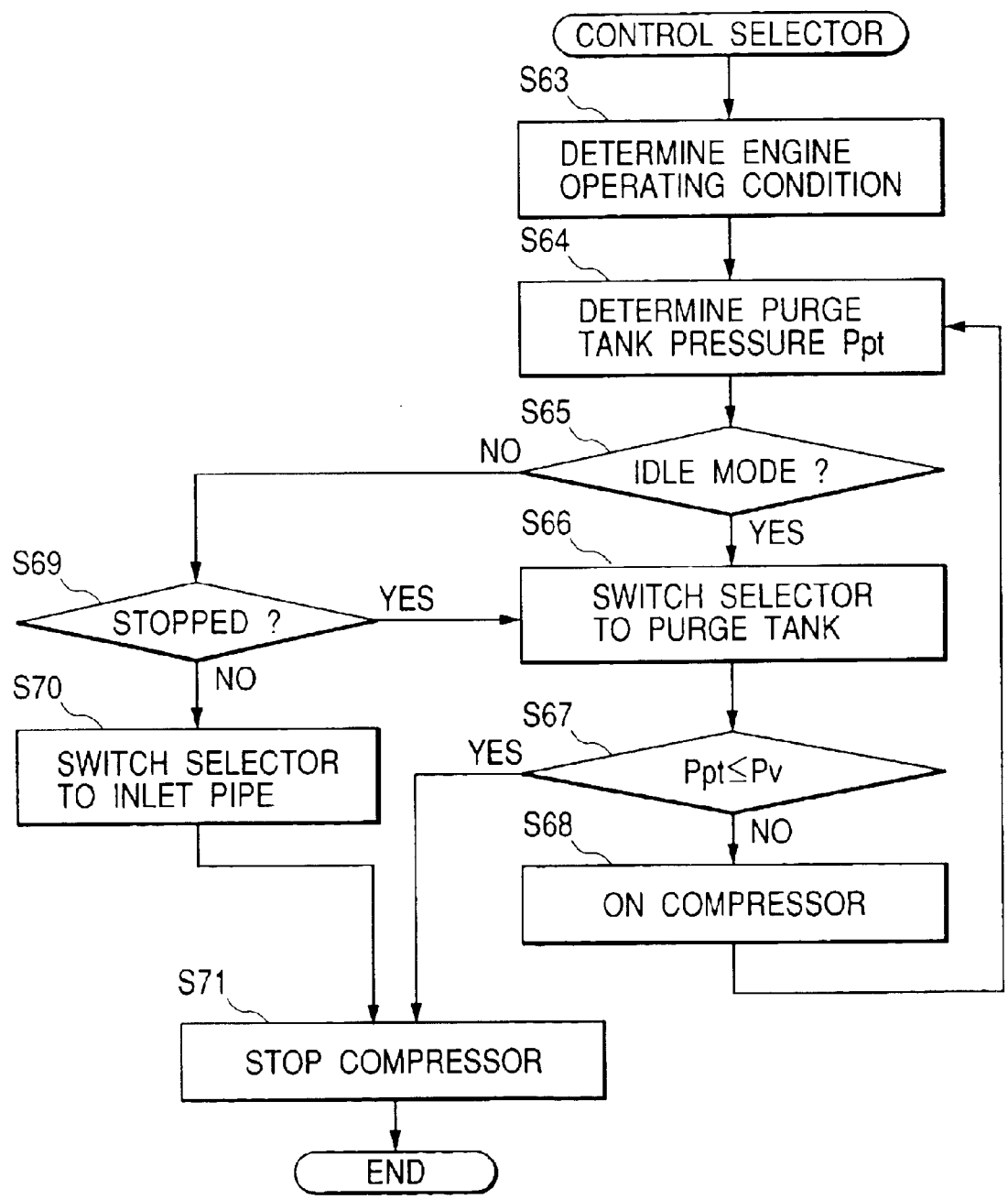
FIG. 20 is a flowchart of a program executed to control a fuel selector valve 19.

FIG. 20 shows a control program for the fuel selector valve 19.

After entering the program, the routine proceeds to step 63 wherein the operating conditions of the diesel engine are determined from outputs of the sensors. Next, the routine proceeds to step 64 wherein the pressure Ppt within the purge tank 20 is determined using an output of the pressure sensor (not shown) installed in the purge tank 20. The routine proceeds to step 65 wherein it is determined whether the diesel engine is in an idle mode of engine operation or not. If a YES answer is obtained, then the routine proceeds to step 66 wherein the fuel selector valve 19 is switched to establish the fluid communication between the high-pressure pump 4 and the purge tank 20. The routine proceeds to step 67 wherein it is determined whether the pressure Ppt in the purge tank 20 is lower than or equal to the vapor pressure Pv of the DME fuel or not. If a NO answer is obtained meaning that the pressure Ppt is higher than the vapor pressure Pv, then the routine proceeds to step 68 wherein the compressor 27 is actuated. The routine returns back to step 64 to measure the pressure Ppt within the purge tank 20 again.

Alternatively, if a YES answer is obtained in step 67 meaning that the pressure Ppt is lower than or equal to the vapor pressure Pv, then the routine proceeds to step 71 wherein the compressor 27 is stopped.

If a NO answer is obtained in step 65 meaning that the diesel engine is not in the idle mode, then the routine proceeds to step 69 wherein it is determined whether the diesel engine is at rest or not. If a YES answer is obtained meaning that the diesel engine is at rest, then the routine proceeds to step 66 to establish the fluid communication between the high-pressure pump 4 and the purge tank 20 through the fuel selector valve 19. Alternatively, if a NO answer is obtained meaning that the diesel engine is running, then the routine proceeds to step 70 wherein the fuel selector valve 19 is switched to establish the fluid communication between the high-pressure pump 4 and the inlet pipe 59 of the diesel engine. The routine proceeds to step 71 wherein the compressor 27 is stopped.

When the high-pressure pump 4 communicates with the inlet pipe 59 through the fuel selector valve 19 in step 70, it will cause the DME fuel leaking out of the high-pressure pump 4 to flow into the diesel engine through the inlet pipe 59. At this time, an air concentration sensor (not shown) installed in an exhaust pipe of the diesel engine is actuated to output a sensor signal to the ECU 2. The ECU 2 adjusts the quantity of fuel injected to the diesel engine to a value suitable for the operating conditions of the diesel engine as a function of the concentration of air as measured by the air concentration sensor.

The purge tank 20, the compressor 27, and the fuel selector valve 18 may be omitted. In this case, the fuel selector valve 19 is so designed as to switch between the fluid communications of the high-pressure pump 4 with the inlet pipe 59 and with the fuel tank 7.

As apparent from the above discussion, the fuel supply system of the invention is so designed as to ensure improved injection capability to inject alternative fuel such as dimethyl ether (DME), which is easy to vaporize and whose physical properties are subject to change with a change in temperature or pressure thereof, into a diesel engine according to operating requirements of the diesel engine. This also results in great decreases in quantity of NOx, CH, and black smoke contained in exhaust emissions of the diesel engine and mechanical noises of the fuel injection system.

The fuel supply system is also designed to bring a gaseous leakage of the fuel, which will be objectionable, especially at the start-up and stop of the engine, into a liquid state and return it back to the fuel tank. This ensures a steady operation of the diesel engine in safety.

The duration of main fuel injection (i.e., the duration of one stroke of the needle valve 30 of the fuel injectors 1) may be divided into a pre-injection period of and a main injection period in the injector control, as discussed in FIG. 9. This avoids injection of an air-fuel mixture of a concentration which will result in an increase in quantity of NOx produced by burning within the main injection period. This also enables the air not consumed within the combustion chamber for the pre-injection period to be used in the main injection period, thus resulting in an increase in output of the diesel engine per unit fuel consumption.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims. For instance, the annular withdrawal grooves 88 and 117 may alternatively be formed to be spiral. The leakage path 93, as illustrated in FIG. 7, may be formed to have a branch line leading to the low-pressure leakage chamber 92.

What is claimed is:

1. An alternative fuel supply apparatus for an internal combustion engine comprising:
   a high-pressure pump working to feed a fuel which is susceptible to vaporization to injectors from a fuel tank through a common rail under a given high pressure;
   a return line including a first line and a second line which extend from said high-pressure pump to the fuel tank;
   a pressurizing mechanism disposed in the first line of said return line to add a back pressure higher than a vapor pressure of the fuel to the first line; and
   a selector to selectively communicate one of (1) the fuel tank and the first line through said pressurizing mechanism (2) the fuel tank and second line, based on a pressure of the fuel within said return line.

2. An alternative fuel supply apparatus as set forth in claim 1, wherein said high-pressure pump includes a pump chamber to which the fuel from the feed pump is inputted through a fuel gallery at a feed pressure, a plunger reciprocating within a plunger chamber formed within a cylinder to pressurize the fuel within the pump chamber and inject the pressurized fuel into the engine through a discharge valve and each of the injectors, a higher-pressure leakage line, and a lower-pressure leakage line, the higher-pressure and lower-pressure leakage lines working to withdraw the fuel leaking out of the pump chamber through a gap between the plunger and the plunger chamber following reciprocating motion of the plunger.

3. An alternative fuel supply apparatus as set forth in claim 2, wherein the higher-pressure leakage line communicates with the fuel gallery through a feed line, and the lower-pressure leakage line communicates with a sealed chamber formed beneath the plunger.

4. An alternative fuel supply apparatus as set forth in claim 2, wherein the fuel flowing through the lower-pressure leakage line is withdrawn through a withdrawing means provided in said cylinder.

5. An alternative fuel supply apparatus as set forth in claim 4, wherein said withdrawing means is implemented by a leakage path formed in a side wall of the cylinder.

6. An alternative fuel supply apparatus as set forth in claim 2, further comprising a solenoid valve which is disposed within an upper end portion of the cylinder and includes a valve member, a valve body, a non-magnetic member, and a plurality of cores, the valve member working to selectively open and close a line connecting between said pump chamber and said fuel gallery to control an amount of the fuel flowing out of said discharge valve, the valve body being disposed within the upper end portion of the cylinder in a fluid-tight fashion, the cores being arranged coaxially with each other through the non-magnetic member and welded rigidly in a fluid-tight fashion inside said solenoid valve.

7. An alternative fuel supply apparatus as set forth in claim 2, wherein said discharge valve is opened in response to a pressure which acts thereon and is lower than said feed pressure.

8. An alternative fuel supply apparatus as set forth in claim 2, further comprising a pressure regulator connected to the fuel gallery, said pressure regulator including a valve which is urged by a spring into a closed state, the valve of said pressure regulator being moved by a back pressure arising from a vapor pressure of the fuel against a mechanical pressure produced by the spring so that the valve is opened to discharge the fuel flowing from the fuel gallery.

9. An alternative fuel supply apparatus as set forth in claim 1, further comprising a pressure sensor and a temperature sensor which measure a pressure and a temperature of the fuel whose bulk modulus of elasticity and density are sensitive to changes in pressure and temperature of the fuel and a control circuit which works to correct a discharged amount of the fuel from said high-pressure pump as functions of the pressure and temperature measured by said pressure and temperature sensors to modify a pressure of the fuel stored in said common rail to a given level and to control a quantity of the fuel injected to the engine through the injectors to a give value as a function of an operating condition of the engine.

10. An alternative fuel supply apparatus as set forth in claim 1, wherein said pressurizing mechanism is implemented by a compressor which works to pressurize the fuel being returned to the fuel tank.

11. An alternative fuel supply apparatus for an internal combustion engine comprising:
   a high-pressure pump connected to a fuel tank through a feed pump, a fuel cooler, and a fuel filter, the fuel tank storing therein a vaporable fuel under pressure higher than a vapor pressure of the fuel;
   a common rail within which the fuel supplied from the fuel tank through said high-pressure pump is stored at a given high pressure, said common rail being connected to injectors working to inject the fuel into the engine;

a pressure limiter installed in said common rail to set a maximum pressure within said common rail;

a fuel return line returning fuel relieved from said common rail through said pressure limiter and fuel flowing out of said high-pressure pump to the fuel tank; and a fuel selector valve, a purge tank, a compressor, and a fuel cooler installed in said fuel return line in this order.

12. An alternative fuel supply apparatus as set forth in claim 11, wherein said high-pressure pump includes a pump chamber to which the fuel from the feed pump is inputted through a fuel gallery at a feed pressure, a plunger reciprocating within a plunger chamber formed within a cylinder to pressurize the fuel within the pump chamber and inject the pressurized fuel into the engine through a discharge valve and each of the injectors, a higher-pressure leakage line, and a lower-pressure leakage line, the higher-pressure and lower-pressure leakage lines working to withdraw the fuel leaking out of the pump chamber through a gap between the plunger and the plunger chamber following reciprocating motion of the plunger.

13. An alternative fuel supply apparatus as set forth in claim 12, wherein the higher-pressure leakage line communicates with the fuel gallery through a feed line, and the lower-pressure leakage line communicates with a sealed chamber formed beneath the plunger.

14. An alternative fuel supply apparatus as set forth in claim 12, wherein the fuel flowing through the lower-pressure leakage line is withdrawn through a withdrawing means provided in said cylinder.

15. An alternative fuel supply apparatus as set forth in claim 14, wherein said withdrawing means is implemented by a leakage path formed in a side wall of the cylinder.

16. An alternative fuel supply apparatus as set forth in claim 12, further comprising a solenoid valve which is disposed within an upper end portion of the cylinder and includes a valve member, a valve body, a non-magnetic member, and a plurality of cores, the valve member working to selectively open and close a line connecting between said pump chamber and said fuel gallery to control an amount of the fuel flowing out of said discharge valve, the valve body being disposed within the upper end portion of the cylinder In a fluid-tight fashion, the cores being arranged coaxially with each other through the non-magnetic member and welded rigidly in a fluid-tight fashion inside said solenoid valve.

17. An alternative fuel supply apparatus as set forth in claim 12 wherein said discharge valve is opened in response to a pressure which acts thereon and is lower than said feed pressure.

18. An alternative fuel supply apparatus as set forth in claim 12, further comprising a pressure regulator connected to the fuel gallery, said pressure regulator including a valve which is urged by a spring into a closed state, the valve of said pressure regulator being moved by a back pressure arising from a vapor pressure of the fuel against a mechanical pressure produced by the spring so that the valve is opened to discharge the fuel flowing from the fuel gallery.

19. An alternative fuel supply apparatus as set forth in claim 11, wherein said pressure limiter sets a maximum pressure within said common rail and is controlled in a fluid-tight fashion by opening and closing a solenoid valve.

20. An alternative fuel supply apparatus as set forth in claim 11, wherein said feed pump is installed in the fuel tank which is kept at a vapor pressure of the fuel, and wherein the vapor pressure of the fuel is added to a feed pressure of the feed pump.

21. An alternative fuel supply apparatus as set forth in claim 11, wherein said fuel selector valve is implemented by a three-way valve, when the fuel returning from each of said high-pressure pump and said pressure limiter is in a gaseous state, said fuel selector valve feeding it to said purge tank, when the fuel returning from each of said high-pressure pump and said pressure limiter is in a liquid state, said fuel selector feeding it to the fuel tank.

22. An alternative fuel supply apparatus as set forth in claim 11, wherein said compressor works to pressurize the fuel which is stored within said purge tank in a gaseous state and bring it into a liquid state through said fuel cooler which is, in turn, returned back to the fuel tank.

23. An alternative fuel supply apparatus as set forth in claim 11, wherein said high-pressure pump has a discharge valve which is opened in response to a pressure lower than or equal to the sum of a feed pressure of the feed pump and a vapor pressure of the fuel within the fuel tank, and wherein at start-up of the engine, a vaporized fuel is withdrawn from said discharge valve to the fuel tank in a liquid state through said common rail, said pressure limiter, said fuel selector valve, and said purge tank.

24. An alternative fuel supply apparatus as set forth in claim 11, further comprising a pressure sensor and a temperature sensor which measure a pressure and a temperature of the fuel whose bulk modulus of elasticity and density are sensitive to changes in pressure and temperature of the fuel and a control circuit which works to correct a discharged amount of the fuel from said high-pressure pump as functions of the pressure and temperature measured by said pressure and temperature sensors to modify a pressure of the fuel stored in said common rail to a given level and to control a quantity of the fuel injected to the engine through the injectors to a give value as a function of an operating condition of the engine.

25. An alternative fuel supply apparatus for an internal combustion engine comprising:

a high-pressure pump working to feed a fuel which is susceptible to vaporization to injectors from a fuel tank through a common rail under a given high pressure;

a return line extending from said high-pressure pump to the fuel tank; and a pressurizing mechanism working to add to said return line a back pressure higher than a vapor pressure of the fuel, wherein said high-pressure pump includes a pump chamber to which the fuel from the feed pump is inputted through a fuel gallery at a feed pressure, a plunger reciprocating within a plunger chamber formed within a cylinder to pressurize the fuel within the pump chamber and inject the pressurized fuel into the engine through a discharge valve and each of the injectors, a higher-pressure leakage line, and a lower-pressure leakage line, the higher-pressure and lower-pressure leakage lines working to withdraw the fuel leaking out of the pump chamber through a gap between the plunger and the plunger chamber following reciprocating motion of the plunger.

* * * * *